(12) United States Patent
Dia et al.

(10) Patent No.: US 11,327,157 B2
(45) Date of Patent: May 10, 2022

(54) ENVIRONMENT SENSING METHOD AND APPARATUS USING A WIDE-ANGLE DISTANCE SENSOR

(71) Applicant: COMMISSARIAT A L'ENERGIE ATOMIQUE ET AUX ENERGIES ALTERNATIVES, Paris (FR)

(72) Inventors: Roxana Dia, Grenoble (FR); Frédéric Heitzmann, Grenoble (FR); Suzanne Lesecq, Grenoble (FR); Julien Mottin, Grenoble (FR); Diego Puschini Pascual, Grenoble (FR); Tiana Rakotovao Andriamahefa, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 289 days.

(21) Appl. No.: 16/505,535

(22) Filed: Jul. 8, 2019

(65) Prior Publication Data

US 2020/0018825 A1 Jan. 16, 2020

(30) Foreign Application Priority Data

Jul. 13, 2018 (EP) .................................. 18305955

(51) Int. Cl.
*G01S 7/48* (2006.01)
*G01S 17/931* (2020.01)
*G01S 17/42* (2006.01)

(52) U.S. Cl.
CPC ............ *G01S 7/4808* (2013.01); *G01S 17/42* (2013.01); *G01S 17/931* (2020.01)

(58) Field of Classification Search
CPC .... G01S 7/4808; G01S 17/931; G01S 17/936; G01S 17/42
See application file for complete search history.

(56) References Cited

U.S. PATENT DOCUMENTS

| 9,534,958 B1* | 1/2017 | Lhamon | G01J 5/0025 |
| 2006/0158647 A1* | 7/2006 | Yao | G01J 3/2823 |
| | | | 356/326 |

(Continued)

FOREIGN PATENT DOCUMENTS

| EP | 3 229 041 A1 | 10/2017 |
| WO | 2014/195047 A1 | 12/2014 |

(Continued)

OTHER PUBLICATIONS

Konolige, "Improved Occupancy Grids for Map Building", Autonomous Robots 4, pp. 351-367, 1997.

(Continued)

*Primary Examiner* — Bryan Bui
(74) *Attorney, Agent, or Firm* — BakerHostetler

(57) ABSTRACT

An environment sensing method includes the following steps, carried out by a data processor a) defining an occupancy grid comprising a plurality of cells; b) acquiring at least one measurement result from a distance sensor, representative of the distance of one or more nearest targets; and c) computing an occupation probability of the cells of the occupancy grid by applying to the measurement an inverse sensor model stored in a memory device in the form of a data structure representing a plurality of model grids associated to respective distance measurement results, at least some cells of a model grid corresponding to a plurality of contiguous cells of the occupancy grid belonging to a same of a plurality of angular sectors into which the field of view of the distance sensor is divided, and associating a same occupation probability to each one of the plurality of cells. An apparatus programmed or configured for carrying out the environment sensing method and a computer-implemented method of computing an inverse sensor model suitable for (Continued)

carrying out the environment sensing method are also provided.

16 Claims, 11 Drawing Sheets

(56) References Cited

U.S. PATENT DOCUMENTS

| | | |
|---|---|---|
| 2014/0035775 A1 | 2/2014 | Zeng et al. |
| 2016/0116916 A1 | 4/2016 | Pink et al. |
| 2017/0269201 A1 | 9/2017 | Adachi et al. |

FOREIGN PATENT DOCUMENTS

| | | |
|---|---|---|
| WO | 2017/050890 A1 | 3/2017 |
| WO | 2017/177650 A1 | 10/2017 |

OTHER PUBLICATIONS

Rakotovao, et al., "Real-Time Power-Efficient Integration of Multi-Sensor Occupancy Grid on Many-Core", 2015.

Elfes, "Occupancy Grids: A Stochastic Spatial Representation for Active Robot Perception", Computer Science > Robotics, pp. 136-146, 1990.

Reineking, et al., "Evidential FastSLAM for grid mapping", Proceedings of the 16th International Conference on Information Fusion, pp. 789-796, Jul. 9, 2013.

Dia, et al., "Evaluation of Occupancy Grid Resolution through a Novel Approach for Inverse Sensor Modeling", IFAC World Congress, Toulouse, France, Jul. 2017.

Pathak, et al., "3d forward sensor modeling and application to occupancy grid based sensor fusion", Intelligent Robots and Systems, IEEE/RSJ International Conference on IEEE, 2007.

Kaufman, et al., "Bayesian occupancy grid mapping via an exact inverse sensor model", in American Control Conference (ACC), 2016 American Automatic Control Council (AACC), pp. 5709-5715, 2016.

Stepan, et al., "Robust data fusion with occupancy grid", IEEE Transactions on Systems, Man, and Cybernetics, Part C (Applications and Reviews), vol. 35, No. 1, pp. 106-115, 2005.

Thrun, et al., "Probabilistic Robotics (Intelligent Robotics and Autonomous Agents)". The MIT Press, p. 287, 2005.

\* cited by examiner

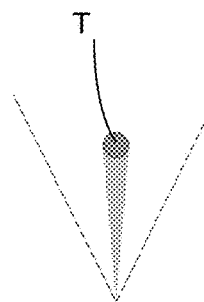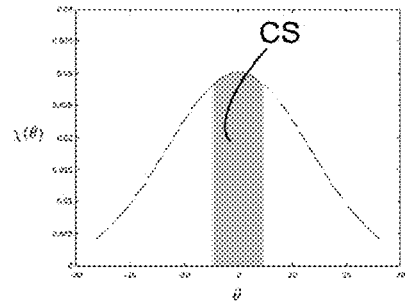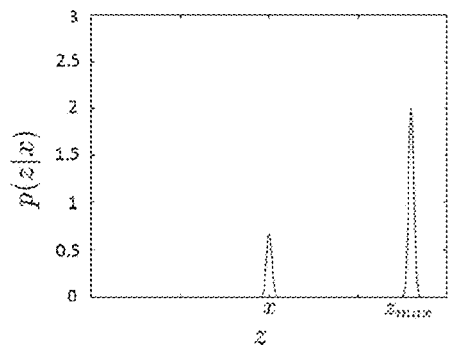
Fig. 9A   Fig. 9B   Fig. 9C
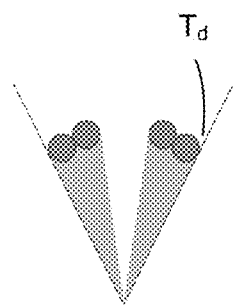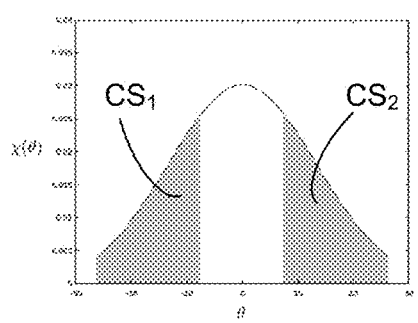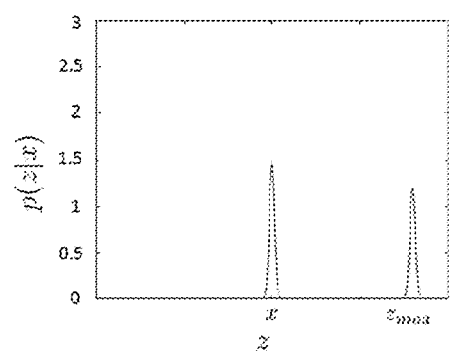
Fig. 10A   Fig. 10B   Fig. 10C
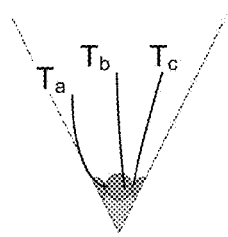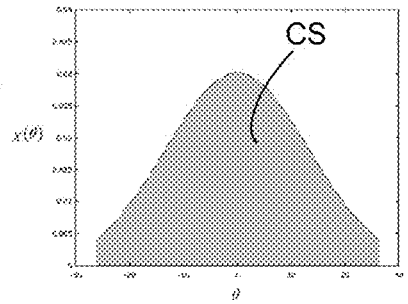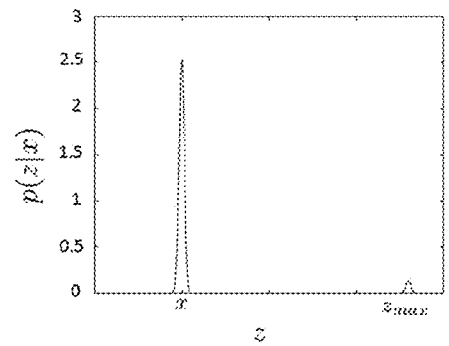
Fig. 11A   Fig. 11B   Fig. 11C

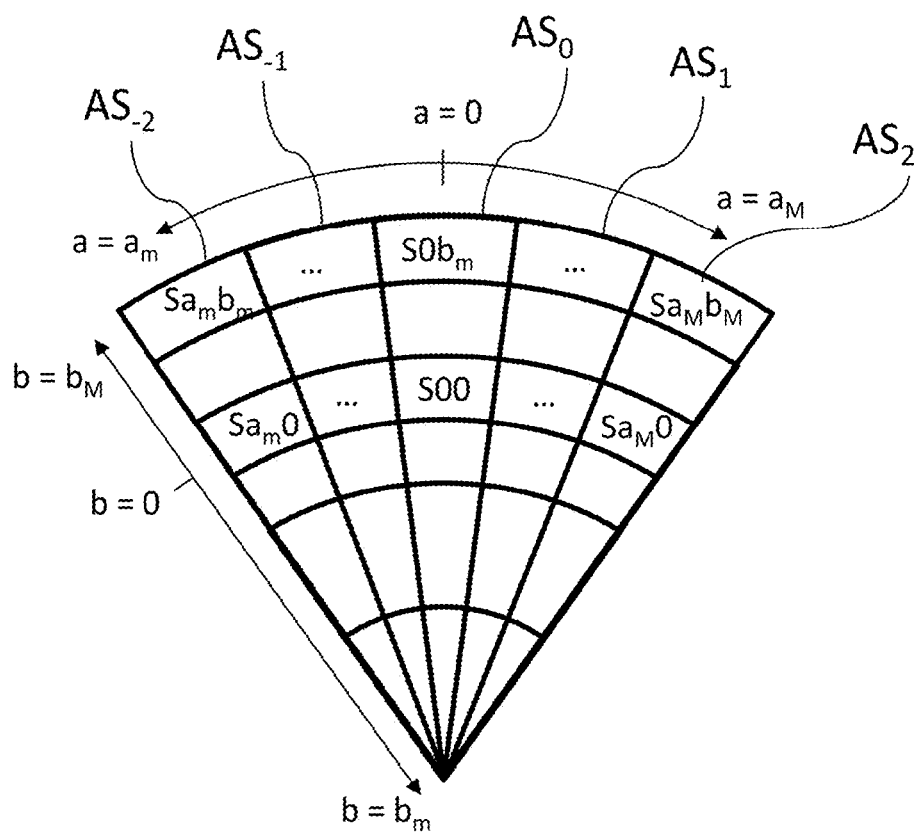
Fig. 14B
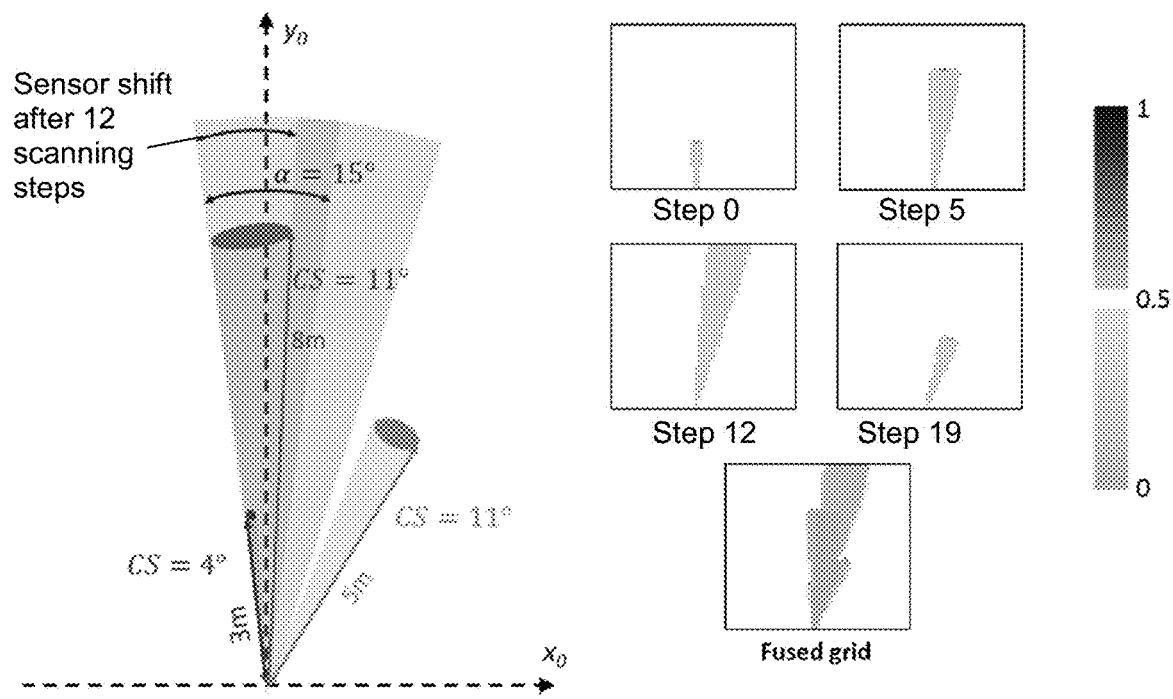
Fig. 15A
Fig. 15B

ENVIRONMENT SENSING METHOD AND APPARATUS USING A WIDE-ANGLE DISTANCE SENSOR

CROSS-REFERENCE TO RELATED APPLICATIONS

This application claims priority to foreign European patent application No. EP 18305955.9, filed on Jul. 13, 2018, the disclosure of which is incorporated by reference in its entirety.

FIELD OF THE INVENTION

The invention pertains to a method and an apparatus for performing environment sensing, and more precisely for determining the occupancy status of a region, carried using a distance sensor. The inventive method and apparatus are particularly suitable to use one or more "wide-angle" distance sensors.

BACKGROUND

A distance sensor is a sensor which provides information about the distance of a nearest target in its field of view. Its physical operating principle is irrelevant: sensors as diverse as lidars, radars, sonars, etc. may be used to implement the inventive method and apparatus.

A distance sensor may be considered to be "wide-angle" when there is a non-negligible likelihood that several different targets are simultaneously present inside its field of view, and at a same distance from it (taking into account the finite resolution of the distance measurement). Therefore, this definition is application-dependent. While in most cases a sensor having a field of view of 15° or more can be considered to be a "wide-angle" sensor this is not always the case, and conversely a narrower field of view may nevertheless be considered "wide" enough to benefit from the invention.

By "target" is meant any physical object or substance that exhibits individuality and can be detected by an appropriate sensor. Thus, inanimate objects, be they natural or artificial, plants, animals, human beings, but also liquid or solid particles in suspension in the air, such as clouds, or indeed liquid or gaseous masses, are considered to be targets.

The invention applies especially to the field of the navigation of robots, drones, autonomous vehicles, etc. and more generally to that of perception. For instance, FIG. 1 shows an autonomous vehicle AV equipped with a distance sensor DS having a broad field of view FOV. Two targets, T1 (a tree) and T2 (another vehicle) are inside the field of view, substantially at a same distance from the sensor. A third target T3 (a signal panel) is nearer to the sensor, but outside its field of view.

There exist two main families of perception techniques: geometric procedures, which are aimed at identifying the geometry of the objects of the surrounding space, and occupancy grid based procedures, which are aimed at determining whether a certain location is occupied by a target (more generally, by a physical body). The invention pertains to occupancy grid based techniques, and more particularly to the so-called probabilistic occupancy grid approach, whose theoretical foundations are described in [1].

A probabilistic occupancy grid is formed by a plurality of cells $c_i$ each representing a small region of space to which an occupation probability $P(o(c_i))$ is attributed, where $P(\cdot)$ denotes the probability of an event, and $o(c_i)$ the event "cell $c_i$ is occupied by a target. The occupation probabilities are computed from the distance measurements, which requires the knowledge of what is known as an "inverse model" of the sensor, or "inverse sensor model" $P(o(c_i)|z)$, where z is a distance measurement result.

Computing an inverse sensor model (ISM for short) is far from being a trivial task, and several approaches to perform it have been proposed.

Most approaches make use of a "single-target" hypothesis, which make them relevant only for the case of narrow-angle sensors. See e.g. [2], [3], [4] and [5].

Another approach ([6]), which is relevant for wide-angle sensors as it does not relies on a single-target hypothesis, consists in a direct formulation of the ISM given a sensor measurement. The occupancy status of cells located outside the measurement range of the sensor beam or behind a predefined distance are not updated: they are kept equal to their prior value. Cells that are within a predefined interval of the detected range are supposed occupied and their occupancy probability is updated. Cells located in a shorter range than the sensor measurement are supposed empty. Such a parametric approximation of the ISM cannot be theoretically assessed, and the choice of its parameters has to be experimentally tuned and validated.

Yet another approach [7], also relevant for wide-angle sensors, uses a forward Sensor Model and apply the Expectation Maximization technique to find the adequate map to a sensor measurement and then compute the occupancy probability in each cell of the grid. This approach suffers from a high computational complexity and it does not always lead to a unique optimum. Moreover, it does not preserve a link between the (known) direct sensor model and the ISM.

Document WO2017/050890—which is incorporated by reference—discloses a method of directly computing an ISM from the corresponding "direct" sensor model, and with a low computational complexity (linear with respect to the number of cells of the occupancy grid). This method, however, is based on the single-target hypothesis, and therefore is not suitable for wide-angle sensors. The document also discloses a method for efficiently "fusing" the information provided by several successive or simultaneous distance measurements, from a same or several different sensors. Interestingly, this "fusion" method only requires integer operation, making it particularly well suitable to real-time applications.

Several patent applications describe method and apparatuses making use of occupation grids, but without describing in detail how said grids are computed—see e.g. US 2014/0035775, EP 3 229 041, WO 2017/177650 WO 2014/195047, US 2016/0116916.

SUMMARY OF THE INVENTION

The invention aims at overcoming these drawbacks of the prior art. More precisely it aims at providing a computer-implemented method of computing an inverse sensor model not relying on a single-target hypothesis and having a comparatively low computational complexity. It also aims at providing a method and an apparatus for performing environmental sensing using such an inverse sensor model.

An object of the present invention is then an environment sensing method comprising the following steps, carried out by a data processor:

a) defining an occupancy grid on a region including a field of view of a distance sensor, the grid comprising a plurality of cells, each having a quantized distance from the sensor;

b) acquiring at least one measurement result from the distance sensor, said measurement result being representative of the distance of one or more nearest targets from the sensor; and c) computing an occupation probability of the cells of the occupancy grid by applying to the target distance measurement an inverse sensor model stored in a memory device cooperating with the data processor;

characterized in that the inverse sensor model is stored in the memory device in the form of a data structure representing a plurality of grids, called model grids, associated to respective possible distance measurement results, at least some cells of a model grid corresponding to a plurality of contiguous cells of the occupancy grid belonging to a same of a plurality of angular sectors into which the field of view of the distance sensor is divided (this is usually the case of most of the cells of the model grid, but some of them may correspond to a single cell of the occupancy grid), and associating a same occupation probability to each one of said plurality of cells.

Another object of the invention is an environment sensing apparatus comprising:

an input port for receiving at a signal representative of a target distance measurement from a distance sensor;

a memory device storing an inverse sensor model and a data processor configured for receiving said signal and using it for computing an occupation probability of the cells of an occupancy grid defined on a region including a field of view of said distance sensor by applying said or one said inverse sensor model to the signal;

characterized in that the inverse sensor model is stored in the memory device in the form of a data structure representing a plurality of grids, called model grids, associated to respective possible distance measurement results, each cell of a model grid corresponding to a plurality of contiguous cells of the occupancy grid belonging to a same of a plurality of angular sectors into which the field of view of the distance sensor is divided, and associating a same occupation probability to each one of said plurality of cells.

Yet another object of the invention is a computer-implemented method of computing an inverse sensor model of distance sensor configured for generating a signal representative of the distance of a nearest target, the method comprising the steps of:

i. defining an occupancy grid on a region including a field of view of the distance sensor, the occupancy grid comprising a plurality of cells, each having a quantized distance from the sensor;

ii. decomposing the field of view of the sensor in a plurality of angular sectors, each comprising a plurality of cells of the occupancy grid having a same quantized distance from the sensor;

iii. for every cell of the occupancy grid, computing the probability density of the value taken by the signal generated by the sensor, conditioned by an occupied state of the cell, said probability density being expressed by a sum of contributions corresponding to different states of the occupancy grid for which the cell is occupied;

iv. for every cell of the occupancy grid, computing the probability density of the value taken by the signal generated by the sensor, conditioned by an empty state of the cell, said probability density being expressed by a sum of contributions corresponding to different states of the occupancy grid for which the cell is empty; and v. computing the inverse sensor model from the probability densities computed at steps iii. and iv.; and vi. storing the inverse sensor model in a memory device in the form of a data structure representing a plurality of grids, called model grids, associated to respective possible distance measurement results, each cell of a model grid corresponding to a plurality of contiguous cells of the occupancy grid belonging to a same angular sector, and associating a same occupation probability to each one of said plurality of cells;

wherein steps iii. and iv. are carried out by considering as equivalent all the configuration of the grid comprising at least an occupied cell belonging to a same angular sector and having a same quantized distance from the distance sensor.

Particular embodiments of the inventive methods and apparatus constitute the subject-matter of the dependent claims.

BRIEF DESCRIPTION OF THE DRAWINGS

Additional features and advantages of the present invention will become apparent from the subsequent description, taken in conjunction with the accompanying drawings, wherein:

FIGS. 7A-7C, 8A-8C, 9A-9C, 10A-10C and 11A-11C illustrate the direct model of a wide-angle distance sensor;

FIGS. 15A and 15B illustrates a method according to an embodiment of the invention, wherein an angular scanning is performed using a wide-angle distance sensor.

DETAILED DESCRIPTION

Before describing the inventive methods and apparatus, it will be expedient to recall some fundamental notions on inverse sensor models and occupancy grids.

Figure 1:
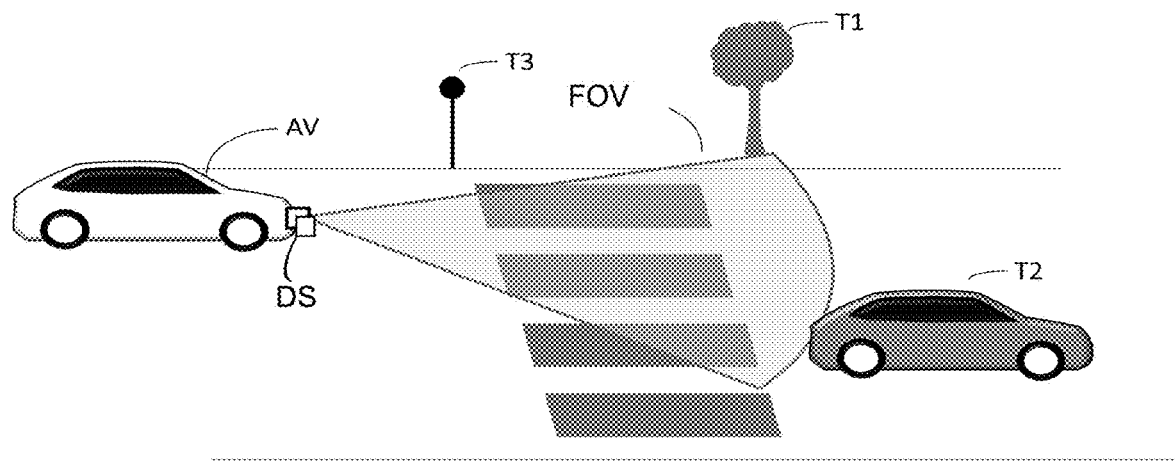
FIG. 1, already described, shows an autonomous vehicle equipped with a wide-angle distance sensor suitable for carrying out the invention.
Figure 2:
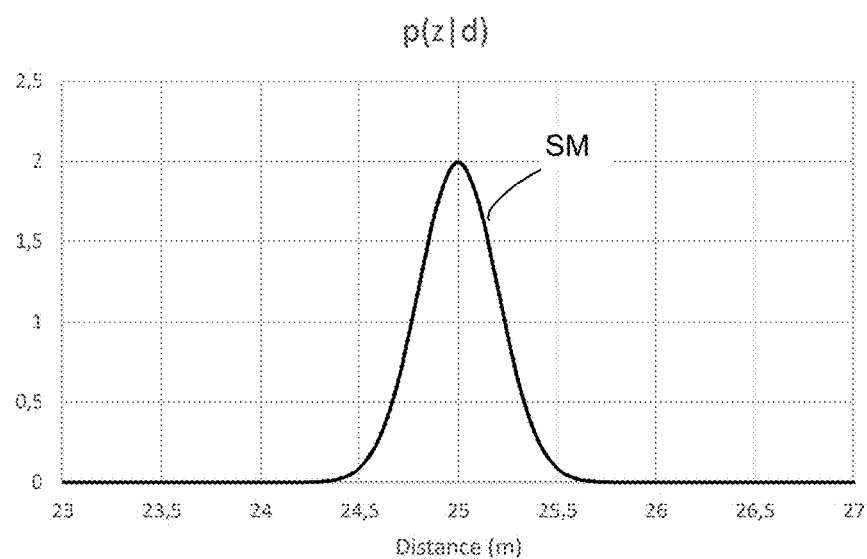
FIGS. 2 to 6, reproduced from WO2017/050890, illustrate the concept of inverse sensor model, its application to an occupancy grid and its quantification.

Let d be the real distance between a target and a distance sensor, and z the output of the sensor. Due to unavoidable measurement incertitude, for a given value of d, the value of z will be a random variable characterized by the conditional probability density function $p(z|d)$ which models the relationship between the real position of a target and its estimation seen by the sensor ("direct model"). FIG. 2 presents an exemplary direct model SM of a sensor; a linear space 50 m long is considered and it is assumed that a target is situated at d=25 m from the sensor. For a sensor with an error which may be modeled by a Gaussian function, the most probable response z will be close to 25 m, but other values will be possible, with a probability density defined by the curve. In the case of an ideal sensor, $p(z|d)=\delta(z-d)$, where $\delta$ is a Dirac Delta function, and the measurement would always be equal to the true distance. The direct model of a sensor can be determined in an experimental manner; typically it can be constructed on the basis of data provided by the constructor (in the Gaussian case, the value of the standard deviation suffices to characterize the model).

Figure 3:
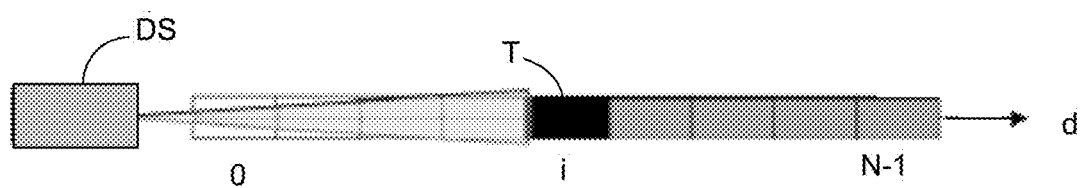

An occupancy grid OG is a partition of a continuous and bounded region of space into a number N of parts, called cells and designated by an index $i \in [0, N-1]$. The cell of index i is indicated by $c_i$. Only for illustrating the concepts of direct and inverse models, the present discussion will be limited to the case of a one-dimensional occupancy grid observed by a single distance sensor DS (or a plurality of co-located sensors), the index i increasing as the sensors get further away ($c_0$ therefore being the cell closest to the sensor and $c_{N-1}$ the one furthest away). This configuration is illustrated by FIG. 3. The one-dimensional hypothesis is ill-suited to wide-angle sensors—indeed, in a more formal way, a sensor may be considered to be "wide angle" when more than one cell of the associated occupancy grid are at a same distance from it. Therefore, this limitation will be removed later.

A target T is a bounded continuous subset of the region of space on which the occupancy grid is defined. A cell $c_i$ is said to be occupied by a target T if $T \cap c_i \neq \emptyset$, to be not occupied by T if $T \cap c_i = \emptyset$. Stated otherwise, if the target covers the cell even partially, the latter is considered to be occupied. Other conventions are possible, but in any event a cell must be either free, or occupied.

For each of the cells of the grid, one considers the binary random experiment "state" which can have one of the two outcomes {occupied; vacant} consisting in knowing whether or not the cell contains a target. The state $s(c_i)$ of cell $c_i$ can therefore take two values, "$o(c_i)$"—cell $c_i$ occupied—and "$e(c_i)$"—cell $c_i$ empty.

In a grid, it is considered that all the cells are independent, so that $$\forall i,j \in [0,N-1], P(o(c_i) \wedge o(c_j)) = P(o(c_i)) \cdot P(o(c_j)) \quad (1)$$

where $\Lambda$ is the logical operator "and" and $P(\bullet)$ denotes the probability of an event (not to be confused with a probability density, designated by a lower case "p").

A measurement z arising from a sensor makes it possible to determine the probability of occupancy $P(o(c_i)|z)$ of a cell $c_i$. For a given measurement z, the set of probabilities $P(o(c_i)|z) \forall i \in [0, N-1]$ constitutes the inverse model of the sensor on the grid. Whilst the direct model of the sensor advises regarding the response of the sensor as a function of the material world, the inverse model expresses the impact of the measurement on the occupancy grid which is the model of the material world that is adopted, thereby justifying the term inverse model.

Figure 4:
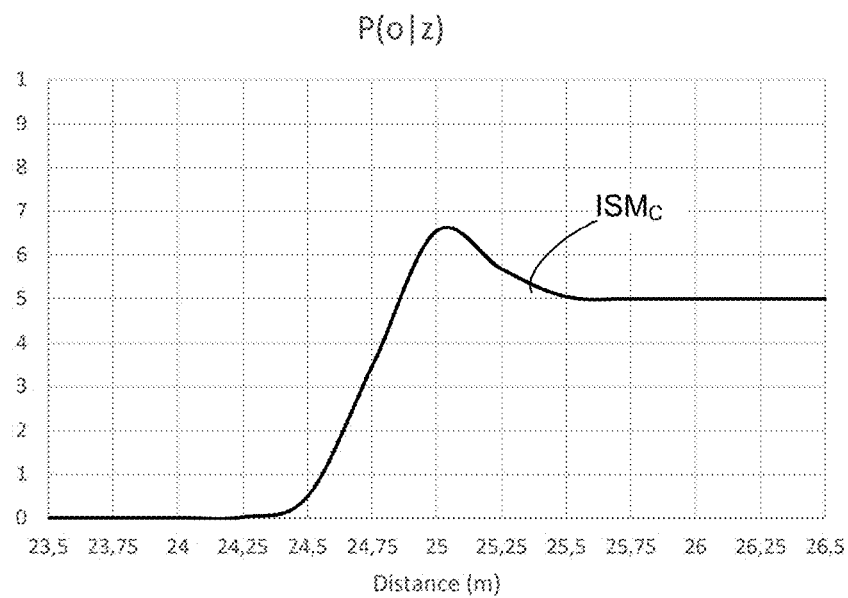

FIG. 4 presents a typical example of (one dimensional) inverse model $ISM_c$ (index "c" means that the model is represented by a continuous function) of a distance sensor, in a case where z=25 m. It may be verified that the occupancy probability is quasi-zero for the cells which are situated a distance of less than 24.25 m from the sensor and attains a peak for a distance of 25 m (corresponding to the measurement provided by the sensor). Beyond 25 m, the occupancy probability decreases until it stabilizes at a value of 0.5, indicative of a total ignorance of the occupancy state of the cells which, being situated beyond the target, are masked by the latter and therefore inaccessible to the sensor.

In accordance with the usage which prevails in the literature, FIG. 4 represents the inverse model by means of a smoothed curve $ISM_c$. A more correct representation would be to display only the points corresponding to the limits of the cells of the grid: indeed, it is not possible to distinguish a "partially" occupied cell from another which would be "totally" occupied, in all cases the distance to the target will be estimated as being the distance to the corresponding cell. This is the spatial error introduced by the grid.

Figure 5:
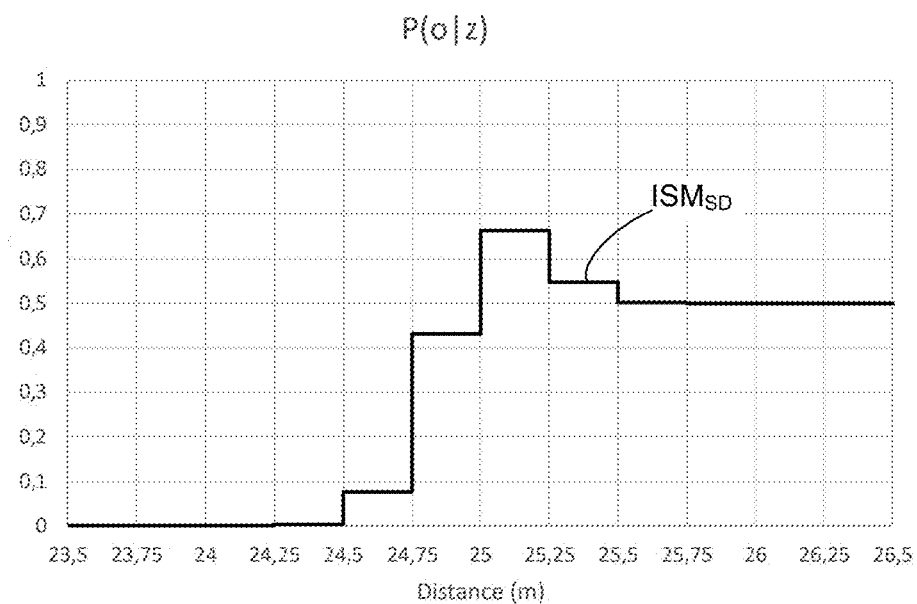

A more apposite version of the inverse model of FIG. 4, taking account of this spatial quantification induced by the grid is presented in FIG. 5 (line $ISM_{SD}$, where "SD" stands for spatially discretized).

It should be stressed that the notions of "occupancy" and of "target distance" are not entirely equivalent. Indeed, saying that a target is at a sensor distance z does not signify only that a certain cell is occupied, but also that all the other cells of the grid that are closer to the sensor are free (otherwise, the first target would have been seen at a distance of less than z). In the aforementioned FIG. 3, the target A is situated in the cell of index i (black); the cells of index less than i are represented as white to indicate that they are free, those of index greater than i are represented as gray to indicate that their occupancy state is unknown.

Computing the inverse sensor model for a given occupancy grid starting from the direct sensor model is not a trivial task. A "naïve" algorithm, disclosed by reference [1], has a computational complexity which is exponential in the number of cells of the occupancy grid. This approach relies on Bayes' theorem:

$$P(o(c_i)|z) = \frac{p(z|o(c_i)) \cdot P(o(c_i))}{p(z)} \quad (3)$$

From the decomposition on the two complementary events o(ci) and e(ci), equation (3) becomes:

$$P(o(c_i)|z) = \frac{p(z|o(c_i)) \cdot P(o(c_i))}{p(z|o(c_i)) \cdot P(o(c_i)) + p(z|e(c_i)) \cdot P(e(c_i))} \quad (4)$$

Where $P(o(c_i))$ and $P(e(c_i))$ evaluate the prior information about the occupancy of cell $c_i$.

Equation (4) requires the computation of $p(z|o(c_i))$ and $p(z|e(c_i))$—i.e. $p(z|s_i)$ for both possible value of $s_i$—from the (direct) sensor model.

Applying the total probability law over all possible grid configurations:

$$p(z|s_i) = \sum_{G_k^{s_i}} p(z|G_k^{s_i} \wedge s_i) \quad (5)$$

where $G_k^{s_i}$ refers to a grid that has no state information for cell $c_i$, hence $G_k^{s_i} \wedge s_i$ represents the configuration of a grid where the state of cell $c_i$ is set to $s_i$ and the state of the other cells are enforced by $G_k^{s_i}$.

Although $p(z|G_k^{s_i} \wedge s_i)$ can be derived from the direct sensor model, eq. (5) involves a sum of $2^{N-1}$ terms, N being the number of cells of the occupancy grid. In practice, therefore, the problem may easily become intractable.

WO2017/050890 has introduced a simplified algorithm having a linear complexity, but only under the single-target hypothesis. One contribution of the present invention, which will be described later, is a linear-complexity algorithm for computing the inverse sensor model under hypothesis which are more general and mode suitable to wide-angle sensors.

The inverse sensor model of FIG. 5 is spatially discrete, but the conditional probability P(o|z) can take any value out of the continuous interval [0, 1]. In a practical, digital implementation, probability values also need to be quantized. WO2017/050890 shows that some particular, non-uniform, quantification schemes allows a dramatic simplification of the computations required for "fusing" together—i.e. combining—the information provided by several distance measurements issued from a same or different sensors. One of these quantification schemes is based on a countable set $S_k$ of probability values given by the union of the following subsets:

$$S_k^- = \left\{ \frac{1}{2 - k \cdot n}, n \le 0 \right\} \quad (6a)$$

$$S_k^+ = \left\{ \frac{k \cdot n + 1}{k \cdot n + 2}, n \ge 0 \right\} \quad (6b)$$

where k is a positive integer ($k \in \mathbb{N}^*$). $S_k$ quantize the interval [0, 1] in a non-uniform manner, with a quantization spacing which is large near the value 0.5 and smaller and smaller on approaching the values 0 and 1. This is doubly advantageous, since:
- a probability of 0.5 indicates uncertain occupancy; it is therefore not useful to be very precise around this value; on the other hand, precision is useful in proximity to the extreme values 0 and 1;
- beyond a certain value of Ink, the discrete probability values get extremely close together; the error introduced by truncating the set is therefore negligible.

Another family of probability quantification scheme is defined by recursion:

$$p_0 = 0, 5; \quad (6c)$$
$$p_1 = p;$$
$$p_2 = F(p, p);$$
$$p_3 = F(p_2, p);$$
$$\ldots$$
$$p_{n+1} = F(p_n, p)$$
$$p_{-1} = 1 - p;$$
$$p_{-2} = F(p_{-1}, p_{-1});$$
$$p_{-3} = F(p_{-2}, p_{-1});$$
$$\ldots$$
$$p_{n-1} = F(p_n, p_{-1})$$

where "p" is a parameter satisfying 0.5<p<1 and $$F(p_i, p_j) = \frac{p_i p_j}{p_i p_j + (1 - p_i)(1 - p_j)} \quad (6d)$$

Figure 6:
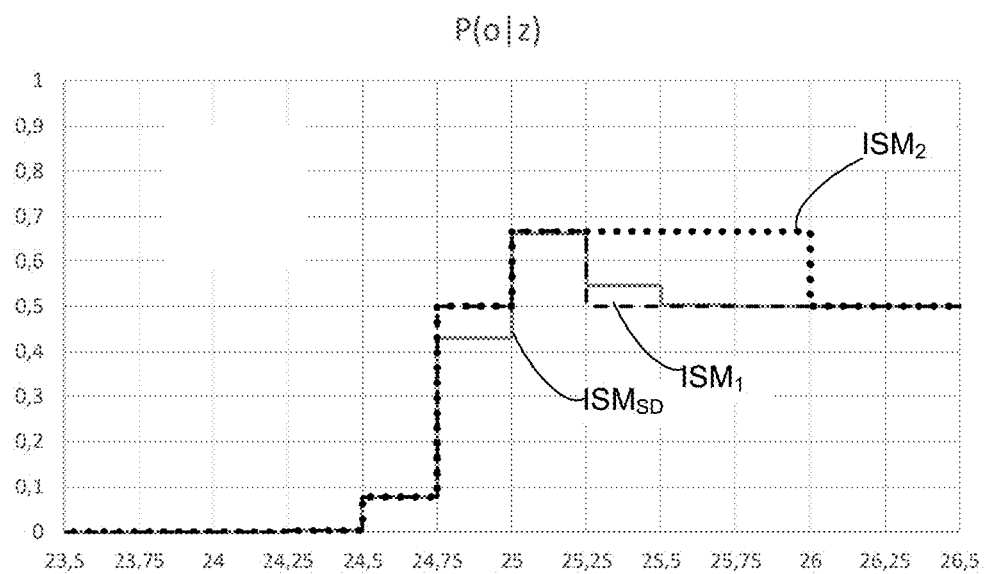
Figures 7A, 7B, 7C:
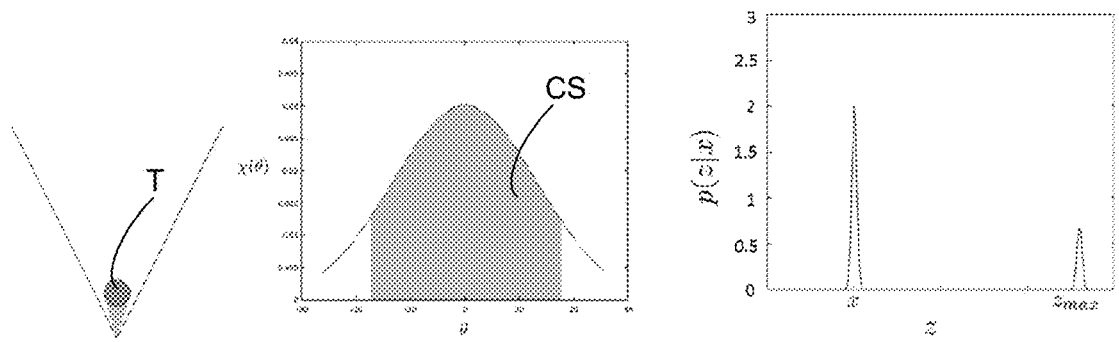
Figures 8A, 8B, 8C:
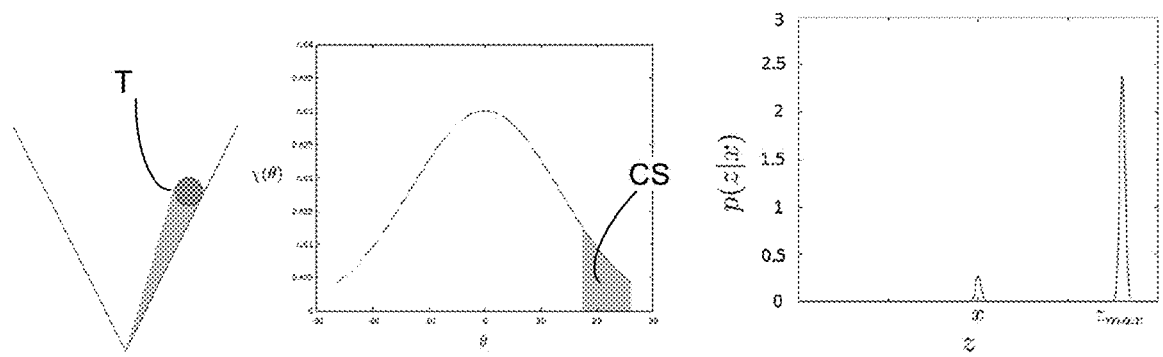

FIG. 6 illustrates two possible ways of quantizing the continuous inverse model of FIG. 5 (curve $ISM_c$). A first possibility consists in replacing the values of the inverse model with the closest elements of $S_k$, so as to minimize the quantization error (curve $ISM_1$) It is seen that this approach may lead to under-estimating the probability of occupancy of a cell, which might not be acceptable in a target detection application. An alternative possibility consists in approximating the values of the theoretical inverse model by the smallest upper bound of $S_k$ (curve $ISM_2$). Thus the occupancy probability is never under-estimated, which may be an advantage for the detection of targets. In other applications, such as people counting, this type of approximation may on the other hand lead to the generation of false-positives.

It will be noted that quantizing the probability values has the consequence that several contiguous cells, to which a continuous inverse sensor model would attribute slightly different occupation probability values, take a same quantized occupation probability value. As it will be discussed in greater detail, this is exploited by some embodiments of the present invention.

In the following, the properties of a direct sensor model (SM for short) suitable for wide-angle distance sensors will be discussed with reference to FIGS. 7A-7C, 8A-8C, 9A-9C, 10A-10C and 11A-11C. The use of such a sensor model for computing an inverse sensor model (ISM) with linear computational complexity will then be described with reference to FIG. 12. Next, the application of this ISM for performing environmental sensing will be described with the help of FIGS. 13A, 13B, 14A and 14B.

The proposed sensor model makes use of 4 hypotheses, namely:
- $H_1$: a larger Cross Section of target T (CS, see FIGS. 7B, 8B, 9B, 10B, 11B, where the Cross Section is highlighted in grey) leads to a higher probability of detection $P_D$ and in consequence to a smaller probability of Miss-Detection $P_{MD}$;
- $H_2$: a target located on the principal axis of the sensor is more likely detected than when it is located towards the sides of the sensor measurement cone
- $H_3$: a maximal probability of detection $P_D^{max}$ occurs when the Cross Section of the target covers the entire measurement cone width of the sensor;
- $H_4$: $P_D^{max}$ is used to compute $P_D$ based on equations (11)-(16), see hereafter.

These hypotheses will be validated in the result section.

A direct formulation of the Inverse Sensor Model, also called "occupancy model"; is given based on equations (4) and (5) without any approximation. It is implemented using a sectoral decomposition of the sensor beam. Let us consider, to begin with, the case of a sensor having a wide angle (e.g. >15°) field of view FOV, within which several targets may be situated. Under the nearest-target hypothesis, the sensor measurement may be caused:
- either by the nearest target(s),
- or by a missed detection.

Both cases can be associated to a probability of detection $P_D$ and of missed detection $P_{MD}$, respectively.

Let us now review the factors that influence the SM. First, the angular position is expected to play a role in determining these probabilities. A target T located on the sensor principal beam axis at distance x (see FIG. 9A) will more likely be detected in comparison to the situation where it is located towards the sides at the same distance (FIG. 10A), generating then a higher $P_D$ and a smaller $P_{MD}$.

A second impacting factor is the target Cross Section (CS), which seems neglected in the literature. For example:
- the target in FIG. 7A has a larger CS than the one in FIG. 9A even if both targets are identical in shape. Hence, the target in FIG. 7A will more likely reflect the signal emitted by the sensor than the one in FIG. 9A, yielding a higher $P_D$.

Targets $T_a$, $T_b$, $T_c$, $T_d$ in FIG. 10A have a larger combined $CS = CS_1 + CS_2$ than the target T in FIG. 9A. However, it cannot be directly stated if they have a higher or lower $P_D$. In fact, targets in FIG. 10A are located at a poor reflecting area (towards the side of the sensor). On the contrary, the target in FIG. 9Aa is located on the principal beam axis.

Therefore, it is clear that the CS of an object and its angular position in the sensor FOV interplay on $P_D$ and $P_{MD}$.

FIGS. 7A-11A show one or more targets at different positions inside the FOV of a distance sensor, FIGS. 7B-11B, the computation of the corresponding cross sections, and FIGS. 7C-11C that of the associated measurement probabilities p(z|x) determined by the sensor model, x being the distance of the nearest target from the sensor and $z_{max}$ the measurement value corresponding to the maximum measurable distance.

Let $T=\{t_i; i=1, \ldots, N_T\}$ be the set of $N_T$ targets located in the sensor FOV and $\Gamma(T)=\{t_1, \ldots, t_M\}$ the set of the M nearest targets at range r* with:

$$r^*=r(t_1)=r(t_2)=\ldots=r(t_M) \quad (6)$$

$r(t_i)$ being the distance of target $t_i$ from the sensor.

Here, it will be assumed that M obstacles can be located at the nearest distance r* in the measurement cone, which can happen as the sensor has a large field of view.

The SM is represented by the probability distribution function p(z|T) where z is the sensor measurement. However, since the nearest-target hypothesis is adopted, the SM is simplified to p(z|Γ(T)). If the two probabilities $P_D$ and $P_{MD}$ associated to Γ(T) are known, a convenient formulation of the SM is:

$$p(z|\Gamma(T)) = \frac{P_D}{\sigma_{r^*}\sqrt{2\pi}} e^{\frac{-(z-r^*)^2}{2\sigma_{r^*}^2}} + \frac{P_{MD}}{\hat{\sigma}\sqrt{2\pi}} e^{\frac{-(z-z_{max})^2}{2\hat{\sigma}^2}} \quad (7)$$

where $z_{max}$ is the maximum range returned by the sensor when there is a missed detection. Here, the sensor is supposed to have a Gaussian model and $\sigma_{r^*}$ and $\hat{\sigma}$ are the standard deviations in the case of detection and missed detection, respectively. Notice that if $P_D$ is known, one can directly deduce $P_{MD}$ because these probabilities are associated to two complementary events and $$P_{MD}=1-P_D \quad (8)$$

Thus, only the formulation of $P_D$ is now detailed, taking into account the reasoning that has been introduced above.

For $i\in\{1, \ldots, M\}$, let $\Omega(t_i)$ be the CS of target $t_i$ within the sensor cone.

From now on, and without loss of generality, the study will be restricted to the two dimensional space. Therefore, the CS is restrained between two angular beams $\theta_{min}(t_i)$ and $\theta_{max}(t_i)$.

Let us define:

$$\Omega(t_i)=[\theta_{min}(t_i),\theta_{max}(t_i)] \quad (9)$$

that depends at the same time on the CS and the angular position of the target in the sensor cone. $\Omega(\Gamma(T))$ is also defined as:

$$\Omega(\Gamma(T)) = \bigcup_{t\in\Gamma(T)} \Omega(t) \quad (10)$$

If $$\Omega(\Gamma(T)) = [-\frac{\alpha}{2}, \frac{\alpha}{2}],$$

where α is the width of the sensor cone, then $P_D$ takes its maximum value, denoted by $P_D^{max}$ (see FIGS. 11a-c). In fact, in this case the nearest target(s) has (have) the maximum possible CS within the sensor FOV. Therefore, it has (they have) the maximum reflection rate.

In order to determine the general formulation of $P_d$, and taking into account the value of $P_D^{max}$, it will be proceeded as follows. First, σ* is defined as the solution over all $\sigma\in \mathbb{R}^{*+}$ verifying the following equation:

$$\int_{-\alpha/2}^{\alpha/2} \frac{1}{\sigma\sqrt{2\pi}} e^{\frac{-\theta^2}{2\sigma^2}} d\theta = P_D^{max} \quad (11)$$

σ* can be found by noting that the previous equation is equivalent to:

$$P(|\theta| < \frac{\alpha}{2}) = P_D^{max} \quad (12)$$

where θ follows a normal distribution N(0, σ²). However, it is known that there exists k* in $\mathbb{R}^{*+}$ verifying:

$$\frac{\alpha}{2} = k^*\sigma \quad (13)$$

It is a known result that:

$$P(|\theta|<k^*\sigma)=2\phi(k^*)-1 \quad (14)$$

where φ(•) is the cumulative distribution function of the standard normal law. Thus, the problem of finding σ* is equivalent to finding $k^*\in\mathbb{R}^{*+}$ verifying:

$$2\phi(k^*)-1=P_D^{max} \quad (15)$$

Then, the value of σ verifying eq. (13) for the deduced value of k* will be the solution σ*. Note that the solution $k^*\in\mathbb{R}^{*+}$ for the previous equation can be easily found numerically using the quantile function of the standard normal distribution. Therefore, σ* is deduced.

Now that σ* is computed, for $$\theta \in [-\frac{\alpha}{2}, \frac{\alpha}{2}],$$

let us define the distribution:

$$\chi(\theta) = \frac{1}{\sigma^*\sqrt{2\pi}} e^{-\frac{\theta^2}{2\sigma^{*2}}} \quad (16)$$

The $\chi(\theta)$ distribution reflects the angular uncertainty of the sensor. Finally, the probability of detection $P_D$ is computed as follows:

$$P_D = \sum_{t \in \Gamma(T)} \int_{\Omega(t)} \chi(\theta) d\theta \qquad (17)$$

In fact, the previous equation sums up the areas between the x-axis and the function $\chi$ over all the intervals $\Omega(t)$ for $t \in \Gamma(T)$. Thus, this methodology takes into account not only the angular uncertainty but also the CS of the nearest targets.

A more accurate formulation of the sensor model may be obtaining by taking further types of sensor noise into account, such as specular reflection or cross-talk. Moreover, the decrease of the value of $P_D^{max}$ when the range increases could also be accounted for. All these improvements fall within the scope of the invention.

The Sensor Model presented here has been validated in real experiments, as it will be discussed later with reference to FIGS. 15 to 21.

The ISM formulation for multi-target sensors based on the nearest-target hypothesis is now presented. The aim is to compute the probability of occupancy of each cell in the two-Dimensional (2D) grid G based on equations (4) and (5) and given measurement z.

To compute $p(z|s_i)$ for $i \in \{0, \ldots, N-1\}$ based on eq. (5), one has to sum up $p(z|G_k^{s_i} \wedge s_i)$ over all possible grid configurations $G_k^{s_i}$, $k=1, \ldots, 2^{N-1}$. However, using the nearest-target hypothesis, it can be noticed that different configurations of the grid might share the same value of $p(z|G_k^{s_i})$ for a certain value $k \in \{1, \ldots, 2^{N-1}\}$. In fact, two grids having the same set $\Gamma$ will have the same SM. Thus, the sum in (5) can be reduced by factorizing these grid configurations. This is demonstrated in the sequel.

Let us first introduce extra notations.

For $i \in \{1, \ldots, N-1\}$, denote $r(c_i)$ and $\Omega(c_i)$ the distance from cell $c_i$ to the sensor and its CS, respectively. In the present study, the sensor is located at the origin of the grid and its principal axis corresponds to the y axis of the grid.

Let $r_{min}$ be the minimum of $\{r(c_i)\}_{i=0}^{N-1}$ and $r_{max}$ its maximum. For each range $r \in [r_{min}; r_{max}]$, let define $C(r)=\{c; c \in \mathcal{G}$ and $r(c)=r\}$ representing the cells at range r. Finally, for a set of cells A verifying $r(c)=r(A) \forall c \in A$ for $r(A) \in \mathbb{R}^+$ (i.e. "all the cells in A are at the same distance to the sensor denoted by $r(A) \in \mathbb{R}^+$"), let define $G(A)$ as a configuration grid where $\Gamma(G(A))=A$. In other terms, all the cells which have a smaller range than $r(A)$ in $G(A)$ are empty, those having a range $r(A)$ are occupied if and only if they are in A, and the cells having a higher range than $r(A)$ cells can have any state (occupied or empty).

Figure 12:
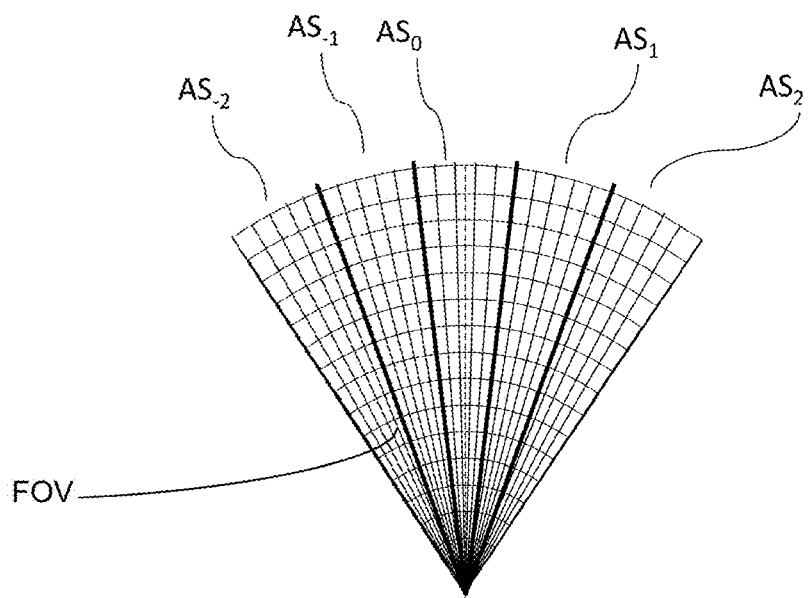
FIG. 12 illustrates the decomposition of the field of view of the sensor into angular sectors, allowing the efficient computation of the inverse sensor model.

For a realistic implementation of this ISM, a uniform decomposition of the field of view into B angular sectors ("sectoral decomposition") $w_i$, $i=1, \ldots, B$ for $B \in \mathbb{N}^+$ is now considered. FIG. 12 shows the decomposition of the field of view FOV of a sensor into B=5 angular sectors $AS_{-2}$, $AS_{-1}$, $AS_0$, $AS_1$, $AS_2$ of a same angular width. It is preferred, but not essential, that B is odd. Also, it is preferred, but not essential, that all the angular sectors have a same width.

The new formulation of the ISM based on the decomposition of the FOV will be first detailed, then the computational complexity will be discussed.

The main idea is that, instead of taking into account all the possible cell state combinations at each distance $r \in [r_{min}; r_{max}]$, as in the "naïf" approach, only the state combinations of $w_m^r$, $m=1, \ldots, B$ are considered. Here, $w_m^r$ represents the set of cells at distance r in sector $w_m$, i.e. $w_m^r = \{c; c \in w_m$ and $r(c)=r\}$. $w_m^r$ is considered occupied if there exists at least one occupied cell that belongs to it.

For $m \in \{1, \ldots, B\}$ and $r \in [r_{min}; r_{max}]$, let $o(w_m^r)$ be the event that $w_m^r$ is occupied and $e(w_m^r)$ is the event that $w_m^r$ is not occupied (i.e. it is empty). For a given set $T_r = \{s(w_1^r), \ldots, s(w_B^r)\}$, where $s(w_m^r) \in \{o(w_m^r), e(w_m^r)\}$ for $m \in \{1, \ldots, B\}$, let $G(T_r)$ be a configuration grid where $\Gamma(G(T_r)) = \{c; c \in w_m^r; m \in \{1, \ldots, B\}$ and $s(w_m^r) = o(w_m^r)\}$. Using the FOV decomposition into angular sectors, $p(z|o(c_i))$ is given by:

$$p(z|o(c_i)) = \sum_{r_{min} \leq r \leq r(c_i)} \sum_{T \in \mathcal{T}_r^{w(c_i)}} p|(z|G(T) \wedge o(w((c_i)))) \cdot P(G(T)) \qquad (18)$$

where $\mathcal{T}_r^{w(c_i)}$ is the set containing all the possible state combinations of $w_m^r$, $m \in \{1, \ldots, B\}$ excluding $w(c_i)$, and $w(c_i)$ denotes the sector which contains cell $c_i$ in the following set $\{w_m^{r(c_i)}, m \in \{1, \ldots, B\}\}$.

For a fixed distance $R \in [r_{min}; r(c_i)]$ and for $T \in \mathcal{T}_r^{w(c_i)}$, the term $p(z|G(T) \wedge o(w((c_i))))$ in (18) can be directly deduced from the SM:

$$p(z|G(T) \wedge o(w((c_i)))) = \kappa \qquad (19)$$

where:

$$\kappa = \frac{P_D^{T,i}}{\sigma_R \sqrt{2\pi}} e^{\frac{-(z-R)^2}{2\sigma_R^2}} + \frac{P_{MD}^{T,i}}{\hat{\sigma}\sqrt{2\pi}} |e^{\frac{-(z-z_{max})^2}{2\hat{\sigma}^2}} \qquad (20)$$

In this case, $P_D^{T,i}$ is computed as before. The main difference is that the combined CS takes into account all cells in each occupied sector in T if $R<r(c_i)$ and all cells of $T \cup w(ci)$ if $R=r(c_i)$.

Besides, $P(G(T))$ in (18) is equal to the probability of intersection of the following events:

1. all the cells at a distance smaller than R are empty. The probability of this event is denoted by $P_1^{R,T}$ and is equal to:

$$P_1^{R,T} = \prod_{c \in \cup_{r<R} C(r)} P(e(e)) \qquad (21)$$

2. at least one cell is occupied in each occupied sector of T. The probability of this event is denoted by $P_2^{R,T}$ and is equal to:

$$P_2^{R,T} = \sum_{w;o(w) \in T} \left\{ 1 - \prod_{c \in w} p(e(c)) \right\} \qquad (22)$$

3. all cells in the empty sectors of T are empty. The probability of this event is denoted by $P_3^{R,T}$ and is equal to:

$$P_3^{R,T} = \prod_{c \in w; e(w) \in T} P|(e(c)) \qquad (23)$$

Thus, in this case $P(G(T))=P_1^{T,A} \cdot P_2^{T,A} \cdot P_3^{T,A}$. Finally, $$p(z\mid o(c_i))=\sum_{r_{min}\leq r\leq r(c_i)}\sum_{T\in\mathcal{T}_r^{w(c_i)}} P_1^{r,T} \cdot P_2^{r,T} \cdot P_3^{r,T} \cdot p(z\mid G(T)\wedge o(w((c_i))))) \quad (24)$$

As before, using the sectoral decomposition, $p(z\mid e(c_i))$ can be written as:

$$p(z\mid e(c_i))=\sum_{r_{min}\leq r\leq r(c_i)}\sum_{T\in\hat{\mathcal{T}}_r^{w(c_i)}} p(z\mid G(T)\wedge e(c_i))\cdot P(G(T)) \quad (25)$$

where $\hat{\mathcal{T}}_r^{c_i}$ is the set containing all the possible state combinations of $w_m^r$, $m\in\{1,\ldots,B\}$ excluding the effect of the state of $c_i$.

For a fixed distance $R\in[r_{min}; r_{max}]$ and for $T\in\hat{\mathcal{T}}_R^{c_i}$, the term $p(z\mid G(T)\wedge e(c_i))$ in (25) can be directly deduced from the SM:

$$p(z\mid G(T)\wedge e(c_i))=k \quad (26)$$

where $$\kappa=\frac{P_D^{T,i}}{\sigma_R\sqrt{2\pi}}e^{\frac{-(z-R)^2}{2\sigma_R^2}}+\frac{P_{MD}^{T,i}}{\hat{\sigma}\sqrt{2\pi}}|e^{\frac{-(z-z_{max})^2}{2\hat{\sigma}^2}} \quad (27)$$

$P_D^{T,i}$ and $P_{MD}^{T,i}$ are computed following the same reasoning as before. The combined CS takes into account all cells in each occupied sector in T.

Besides, $P(G(T))$ in (25) is equal to the probability of intersection of the following events:

1. all the cells at a distance smaller than R are empty. The probability of this event is denoted by $P_1^{R,T}$ and is equal to:

$$P_1^{R,T}=\prod_{c\in\bigcup_{r<R}C(r)}P(e(c)) \quad (28)$$

2. at least one cell is occupied in each occupied sector of T. The probability of this event is denoted by $P_2^{R,T}$ and is equal to:

$$P_2^{R,T}=\prod_{w;o(w)\in T}\left\{1-\prod_{c\in w}p(e(c))\right\} \quad (29)$$

3. all cells in the empty sectors of T are empty. The probability of this event is denoted by $P_3^{R,T}$ and is equal to:

$$P_3^{R,T}=\prod_{c\in w;e(w)\in T}P\mid(e(c)) \quad (30)$$

In (28), (29) and (30), the probability $P(e(c_i))$ is equal to 1 since $c_i$ is known to be empty. Finally, $P(G(T))=P_1^{T,A} \cdot P_2^{T,A} \cdot P_3^{T,A}$, and $p(z\mid e(c_i))$ can be written as:

$$p(z\mid e(c_i))=\sum_{r_{min}\leq r\leq r_{max}}\sum_{T\in\hat{\mathcal{T}}_r^{c_i}} P_1^{r,T} \cdot P_2^{r,T} \cdot P_3^{r,T} \cdot p(z\mid G(T)\wedge e(c_i)) \quad (31)$$

Applying the sectoral decomposition, the computation of $P(o_i\mid z)$, $i\in 0,\ldots,N-1$ (respectively, $P(e_i\mid z)$) requires less than $$\frac{N}{B}2^B$$

operations because only the combination of B sectors is considered at each range. Therefore, the complexity is linear with respect to N.

The sectoral decomposition technique supposes that the Sensor Model generated by considering only one nearest occupied cell in a sector is the same as the one generated by considering that all the nearest cells in the sector are occupied. When B increases, in such a way that only one nearest occupied cell is located in each sector, the sectoral decomposition is equivalent to the exact formulation of equations (4) and (5), and the computational complexity becomes exponential. The interest of the sectoral decomposition lies in the fact that, depending on the degree of detection required, one can tune the number of sectors in order to avoid unnecessarily complex computations. This kind of trade-off can be useful when free space detection is considered. In that case, detection of occupied regions with a high precision is not crucial. As a consequence, one can choose small values of B, leading to a low-complexity computation. This approach also helps keeping the link between the SM and the ISM for multi-target sensors.

The ISM defines a probability value for each cell of the occupancy grid and for each possible measurement value z. Up to now, it has been considered that z may assume any value out of a continuous range (see FIG. 2), but for digital implementations it is necessary to quantize it. Therefore, the ISM can be represented as a finite set of grids OG', each having the same structure (shape, size and number of cells) as the occupancy grid OG to be determined as a function of actual measurements. It will be noted that the occupancy grid OG preferably has a "Cartesian" geometry, which is particularly well-suited for application in which the distance sensor may move, while the sensor model is more easily defined in polar coordinates (see FIG. 12).

Figure 13A:
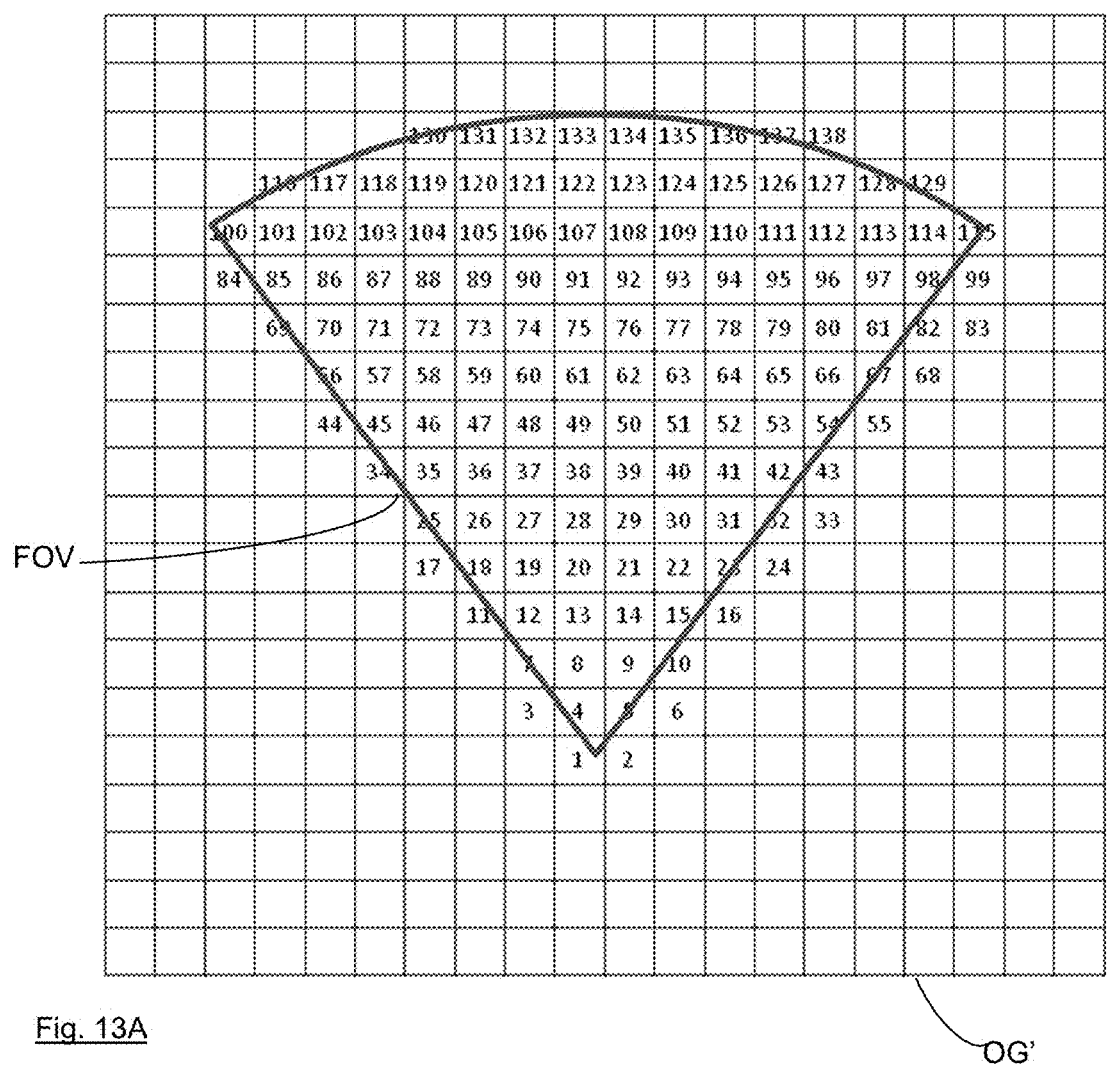
FIGS. 13A and 13B illustrate the concept of "model grid", used by the inventive environmental sensing method.

This is illustrated on FIG. 13A for a case where the field of view FOV of the sensor fully or partially overlaps with 138 cells of grid OG'. The inverse sensor model will therefore consist of 138·M probability values, where M is the number of possible quantized measurement probability values. This may lead to a significant memory occupation, undesirable in embedded applications.

However, a more convenient representation of the ISM is possible. First of all it will be recalled that, by construction of the ISM, all the cells of the grid situated at a same distance from the sensor and belonging to a same angular sector, have a same conditioned probability $P(o\mid z)$ for any z. Therefore, these cells may be grouped together and treated as a same entity. Moreover, as discussed above in reference to FIG. 6, several contiguous cells having different distances from the sensor (i.e. having different radial positions, considering that the sensor is at the origin of a polar coordinate system) may be attributed a same occupation probability value due to probability quantization (cf. FIG. 6); therefore, cells can also be grouped together in the radial direction. As a result, the ISM for a given measurement result may be represented by a coarser grid than the occupancy grid OG, only defined over the field of view of the sensor. This coarse grid, called a "model grid" MG preferably has a polar geometry and is constituted by "macrocells", each corresponding to a plurality of cells of the occupancy grid OG. It should be noted that model grids of a same ISM but corresponding to different measurement results will have a somehow different structure, as the merging in the radial direction will be different from a model grid to another (in the "azimuthal" direction, on the contrary, all model grids will use a same angular sector decomposition).

Figure 13B:
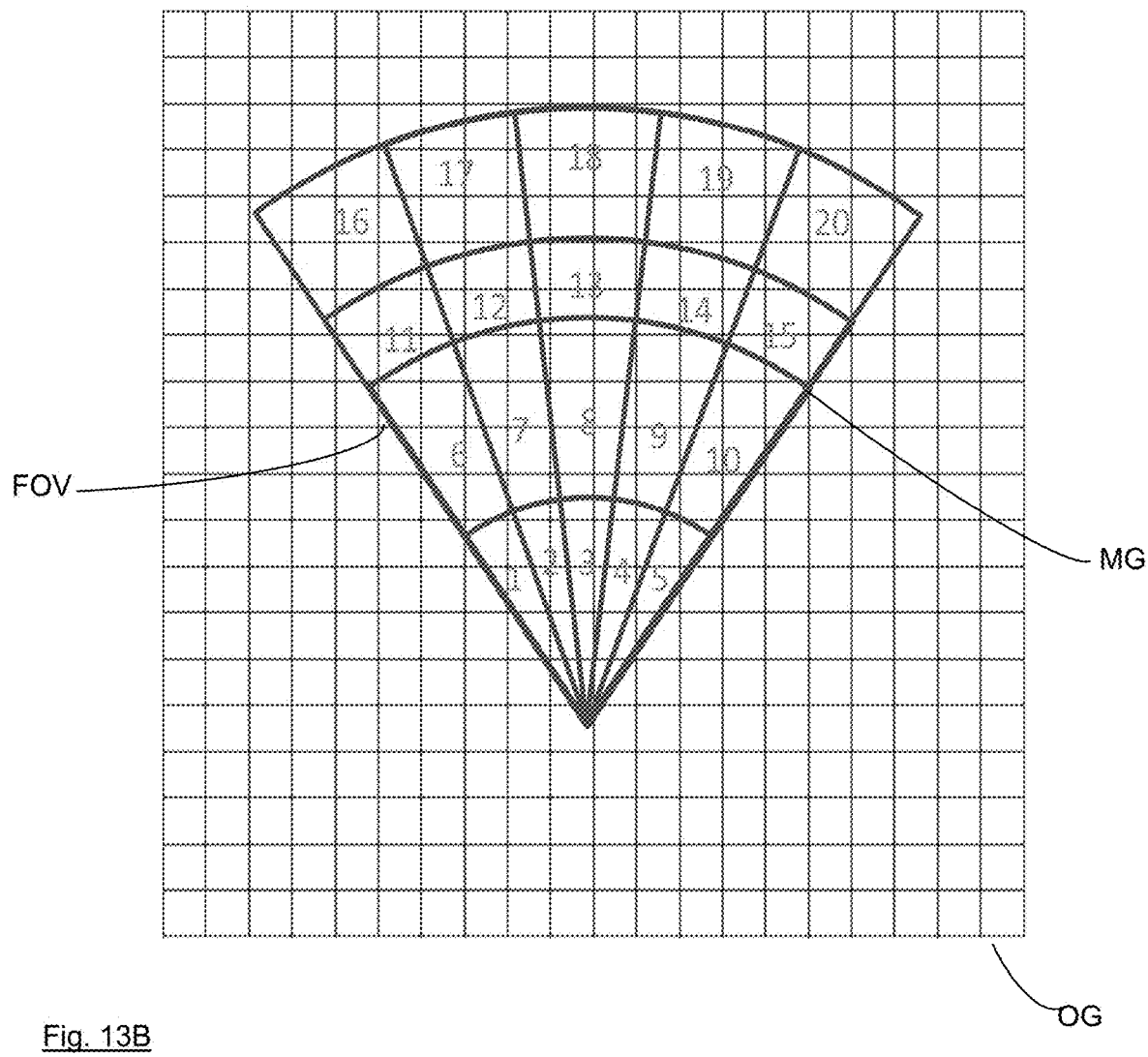

FIG. 13B represents a 20-macrocell model grid MG overlap to an occupancy grid OG. Comparison with FIG. 13A allows reducing the number of probability values to be stored for each model grid (in this specific example, from 138 to 20). According to particular embodiments of the invention, the memory occupation may be further reduced. For instance, only data pertaining to the central angular sector $AS_0$ may be stored, and probability values for macrocells of the other angular sectors ($AS_{-2}$, $AS_{-1}$, $AS_1$, $AS_2$) be calculated—even in real time—from the stored data. Also, the stored data may not directly represent occupation probabilities, but parameters allowing computing them e.g. as a function of environmental conditions (such as visibility) inputted by a user or acquired through a different sensor.

It will be noted that some cells of the occupancy grid overlap with several macrocells of the model grid, due to the different geometries of the two grids. The simplest way to deal with this situation is to associate each cell of the occupancy grid to the macrocell with which it has the largest overlap. Other possibilities exist, such as computing a weighted average (but a significantly higher computational cost).

Figure 14A:
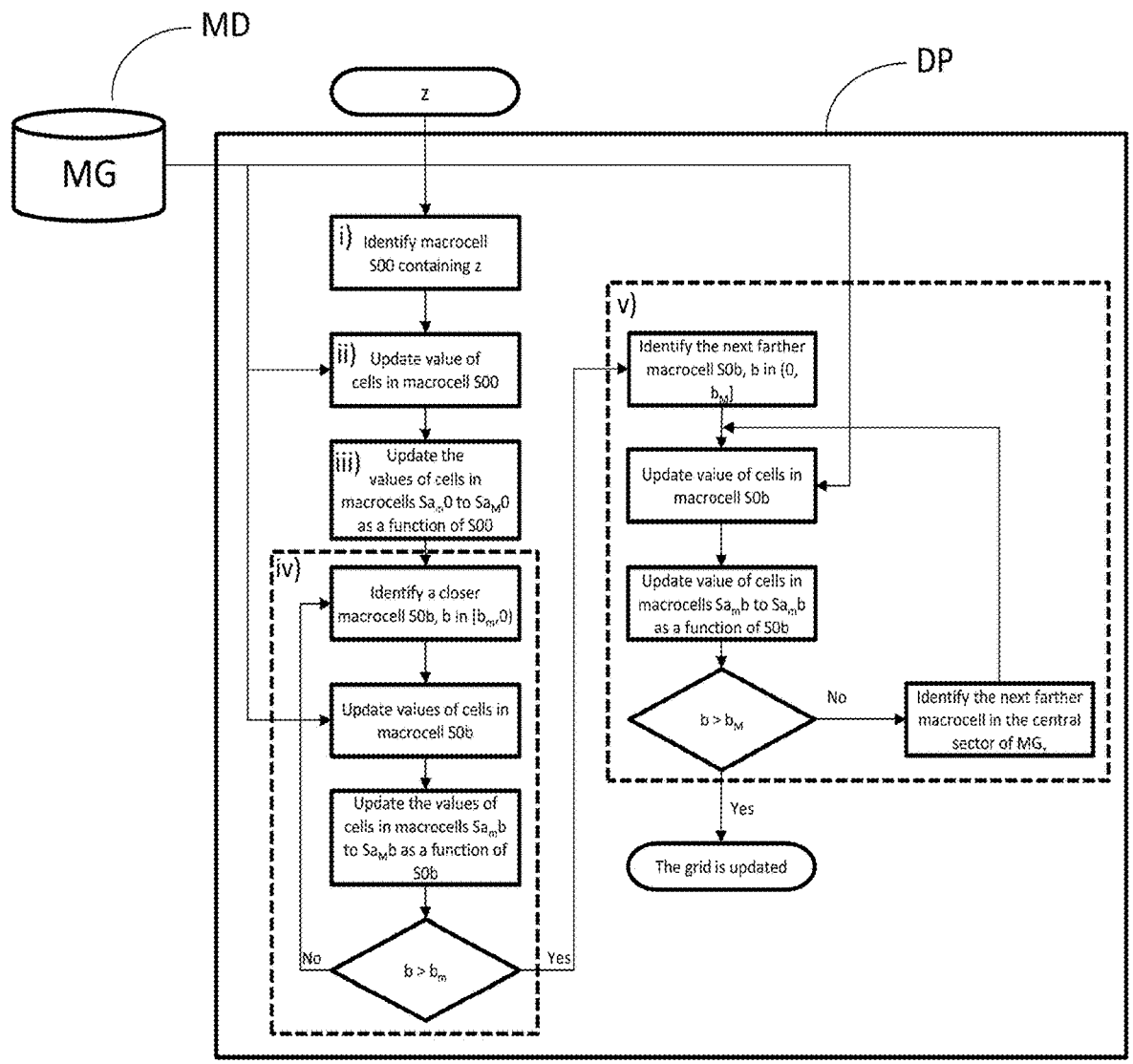
FIG. 14A comprises a flow-chart of an environment sensing method according to an embodiment of the invention and a block diagram of an environment sensing apparatus according to another embodiment of the invention, and FIG. 14B a representation of a model grid illustrating some symbols used in FIG. 14A.

FIG. 14A simultaneously represents a block diagram of an apparatus for carrying out the inventive environmental sensing method, and the method itself.

The apparatus comprises a data processor DP and a memory device MD, and has at least an input port IP for receiving measurement signals from one or more distance sensors DS, typically of the wide-angle type.

Memory device MD is a memory, such as e.g. a flash memory, storing at least one inverse sensor model in the form of a data structure representing a set of model grids, as described above, each one associated to a possible value of a distance measurement from a distance sensor. As explained above, the data structure may not represent directly the model grids, but data allowing a quick calculation thereof.

Data processor DP may be a microprocessor associated to a memory storing a suitable program (which may coincide with memory device MD or be distinct from it), an Application Specific Integrated Circuit (ASIC), a suitable programmed Field Programmable Gate Array (FPGA), an electronic board comprising one or more of these devices, etc.

The data processor is configured (i.e. hardwired) and/or programmed in order to compute the occupation probability of the cells of the occupancy grid by applying the ISM stored in the memory device to the target measurement result received from the distance sensor through the input port. The computation is described here below with reference to FIGS. 14A and 14B.

When a measurement result z is received from the distance sensor, the data processor extracts from memory device MD the model grid MGz associated to said measurement result, and then identifies the macrocell S00 of its central angular sector $AS_0$ at distance z from the origin O (i). Then (ii) it updates the probability values of all the cells of the occupancy grid which overlap with macrocell S00. In the following step (iii), the probability values of the cells of the occupancy grid overlapping with macrocells $Sa_m0$ to $Sa_M0$ (i.e. the macrocells of peripheral angular sector of the model grid, also at distance z from the origin O) are updated as a function of the probability value associated to S00. These operations are then repeated for macrocells closer to the origin (S0b and $Sa_mb$ to $Sa_Mb$ for b decreasing from 0 to $b_m$)—step (iv)—and then for macrocells farther away from O (step v).

An interesting feature of this method is that several cells of the occupancy grid (all those which overlap with a same macrocell of the model grid) are updated simultaneously. Advantageously, these simultaneous update may be carried out by direct memory access (DMA) device, freeing computational resources of the processor which may be used for treating other macrocells.

When the first distance measurement result is received, the cells of the occupancy grid are initialized at a prior occupancy probability value (typically 0.5, expressing complete uncertainty). "Updating" the occupancy grid simply means associating to each cell the probability value of the corresponding model grid macrocell. In general, however, several successive (or simultaneous) measurement results will be acquired. In this case, updating the occupation probabilities requires fusing the occupation probabilities computed from the separate distance measurements to obtain a "consolidated" occupancy grid. It will be noted that it is the use of several measurements corresponding to different positions and/or orientations of the sensor which allows taking advantage of the full spatial resolution of the occupancy grid—which is not the case for a single measurement. For instance, a rotating sensor allows performing an angular scanning, acquiring several successive distance measurement corresponding to different orientations of the sensor. Preferably, two consecutive orientations are separated by less than one half of the angular width of the field of view of the sensor, which allows recovering a better angular ("azimuthal") resolution than the width of the angular sectors. For an even finer resolution two consecutive orientations may also be separated by less than one half of the angular width of an angular sector.

Given two distance measurements $z_1$ and $z_2$ from two distance sensors (or from the same sensor at different time) sharing a common occupancy grid, the probability fusion is performed using the following equation:

$$P(o_i|z_1, z_2) = \frac{[1 - P(o(c_i))]P(o(c_i)|z_1)P(o(c_i)|z_2)}{[1 - P(o(c_i))]P(o(c_i)|z_1)P(o(c_i)|z_2) + P(o(c_i))P(e(c_i)|z_1)P(e(c_i)|z_2)} \quad (32)$$

Generalization to more than two sensors is immediate—it suffices to consider $P(o_i|z_1, z_2)$ as the inverse model of a "virtual" sensor and to fuse it with the measurement provided by a third sensor, and so on and so forth.

Document WO2017/050890 teaches a method of performing probability fusion only using integer arithmetic, provided that a suitable ISM quantification schemes (such as the one of equations 6a-6b or 6c-6d) has been used. This method also applies to the present invention.

The sectoral decomposition technique has been tested on a 2D uniform square grid of length 5 m composed of cells of length 0.2 m. The ISM was evaluated for a sensor measurement z=3 m coming from a typical 2D sensor having a FOV of 15°, $\sigma_r$=0.1+0.01r and $\bar{\sigma}$=0.15. Thus, only the probability of occupancy of cells located in the sensor beam was evaluated.

The ISM has been computed for 3 values of B, namely, B=1, 3 and 5, respectively. Note that B=1 corresponds to the case where the sensor beam is not partitioned. The results show that for small values of B, the empty space is well detected while the occupied space is mistaken for an undetermined space. When B increases, the probability of occupancy increases, allowing to derive a stronger opinion about the occupied space. This shows that in order to highlight the occupancy space, one has to choose higher values of B, which comes as well with a higher computational complexity. In fact, when B increases, the sectoral decomposition technique will tend to the exact formulation. However, when empty space assessment is essential (for instance in navigation applications), the sectoral decomposition technique when using small values of B is very efficient from a computational point of view because it will requires a very low number of operations.

The inventive method was also tested in a configuration with three objects $t_1$, $t_2$ and $t_3$ placed in front of the sensor at different positions with ranges $r_1$=3 m, $r_2$=8 m and $r_3$=5 m, see FIG. 15A for the experimental setup. The objective of this experiment was to demonstrate that the proposed ISM together with sectoral decomposition can be used in conjunction with scanning to precisely localize obstacles in the environment and assess free space. 25 scans were performed with a clockwise shift of 1° of the sensor FOV, starting from the position where the principal axis of the sensor cone is aligned with $y_0$ of FIG. 15A. In FIG. 15B, the occupancy grid obtained after the first, 6th, 12th and 19th steps of the scan, when B=3 are displayed. The last picture of FIG. 15B is obtained by computing a Bayesian Fusion of all the 25 occupancy grids (see WO2017/050890). Note that the three obstacles can be precisely localized thanks to the scanning.

The VL53L0X sensor from STMicroelectronics has been considered for validation purpose. This sensor is a new generation Time-of-Flight (ToF) laser ranging module. Its 940 nm VCSEL emitter (Vertical Cavity Surface-Emitting Laser) is eye safe. It can measure an absolute distance till a target up to 2 m. Even if it has not specifically been designed to address Automotive applications, the VL53L0X sensor is considered here because a sensing range of 2 m is of interest for precise positioning applications such as for instance assistance car park. The VL53L0X presents a multi-target behavior with a large Field-of-View of 25°. Measurement analyses provided in the sensor datasheet correspond to a complete Field-of-View coverage. However, when targets are "angularly separated" in the sensor measurement cone, with similar reflectance, the distance provided by the sensor is the one to the nearest obstacle. Note that when two obstacles $t_1$ and $t_2$ exhibit close angular positions but with different ranges $r_1 \neq r_2$, the measurement provided by the sensor may be faulty, i.e. $z \neq r_1$ and $z \neq r_2$.

In the tests performed during the experiments, the obstacles consisted of rectangular card boards having a length of 40 cm with variable widths.

First Experiment: Influence of the Target Angular Position in the Sensor Cone

The first experiment was conducted using a cardboard having a width of 10 cm. The cardboard was placed in 4 different distances from the sensor, namely, d1=0.5 m, d2=0.75 m, d3=1 m and d4=1.25 m. It was also placed in 5 different angular positions with respect to the principal axis of the sensor measurement cone, namely, $\theta_1$=0°, $\theta_2$=3°, $\theta_3$=5°, $\theta_4$=9° and $\theta_5$=12.5°. An experimental Probability of Detection was computed for each case based on the following equation:

$$PD = 1 - \frac{\text{Number of missed measurements}}{\text{Total number of measurements}}$$

where a measurement is considered to be missed if it is larger than the maximal possible range returned by the sensor, denoted by $z_{max}$.

Figure 16:
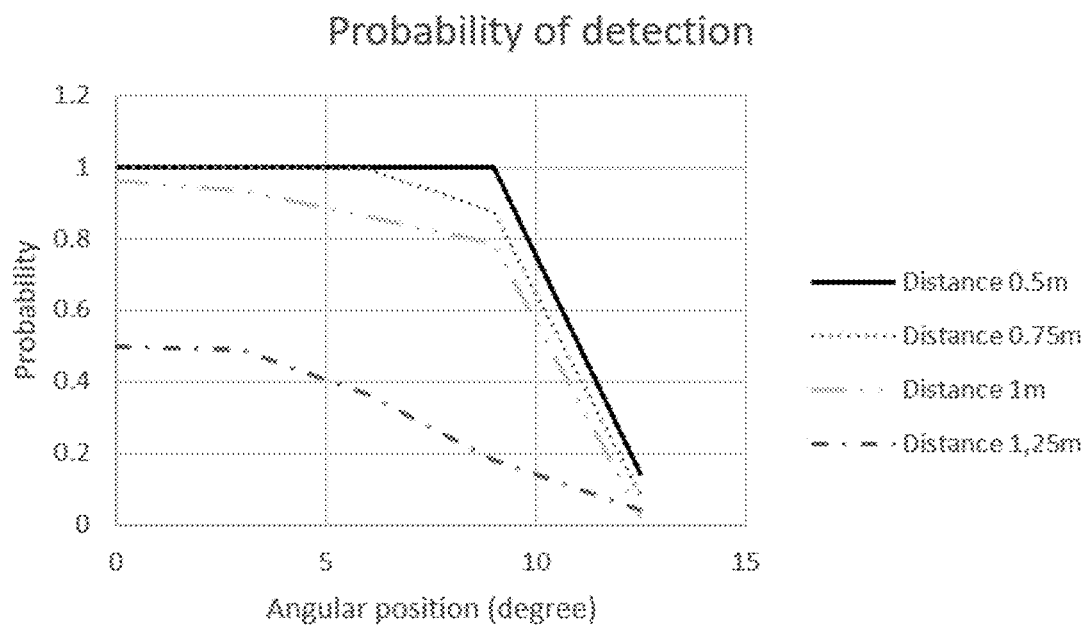
FIGS. 16 to 21 are plots illustrating some technical results of the invention.

The results provided in FIG. 16 allowed to evaluate against hypotheses $H_1$ and $H_2$. The Probability of Detection obtained with the target at a fixed distance $d_i$, $i \in \{1, 2, 3, 4\}$ was analyzed with respect to its angular position in the sensor FOV. As it can be noticed, this probability decreases when the target reaches an angular position towards the sides of the sensor measurement cone, proving that $H_2$ is true. On the other hand, when the results related to the four distances for a fixed angular position $\theta_i$, $i \in \{1, 2, 3, 4\}$ are compared, one can notice that when the distance increases (leading to a smaller CS), the probability of detection $P_D$ is decreasing. This proves that hypothesis $H_1$ is true.

Second Experiment: Influence of Target CS on $P_D$

Figure 17:
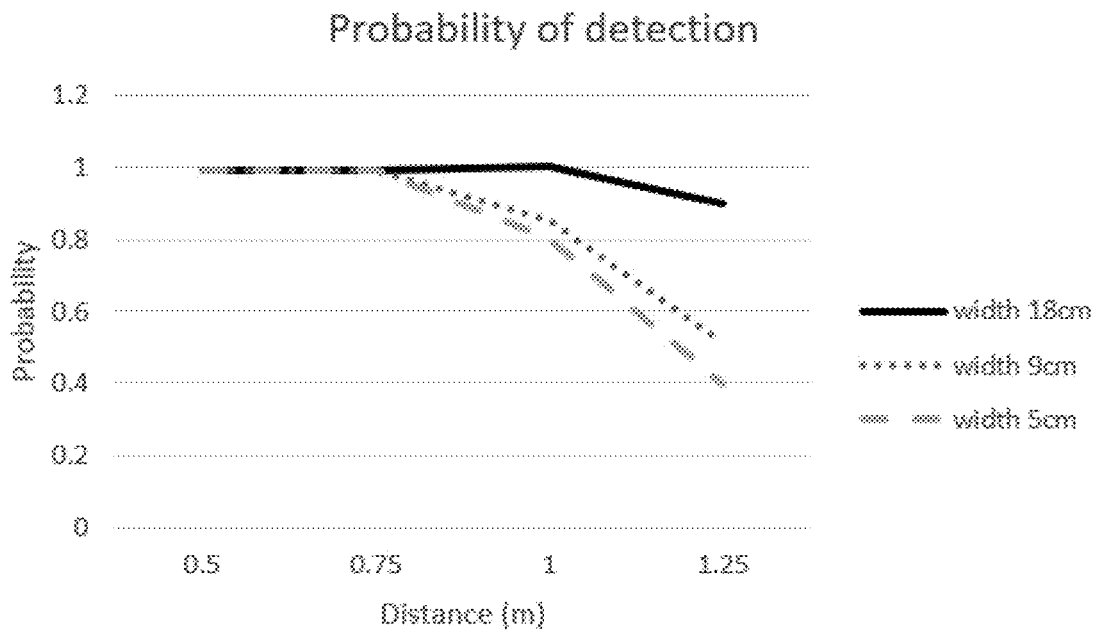

Hypothesis $H_1$ is highlighted on FIG. 17, showing results from the second experiment.

Here, three cardboards with width respectively equal to w1=5 cm, w2=9 cm and w3=18 cm were placed on the principal axis of the sensor FOV (i.e. $\theta$=0°) at four different distances, namely, d1=0.5 m, d2=0.75 m, d3=1 m and d4=1.25 m. Comparing the value of $P_D$ for a fixed distance $d_i$, $i \in \{1, 2, 3, 4\}$ for the three different widths, it can be clearly noticed that when the width increases, generating a larger CS, the probability of detection $P_D$ increases too.

Third Experiment: Maximal Probability of Detection $P_D^{max}$

Figure 18:
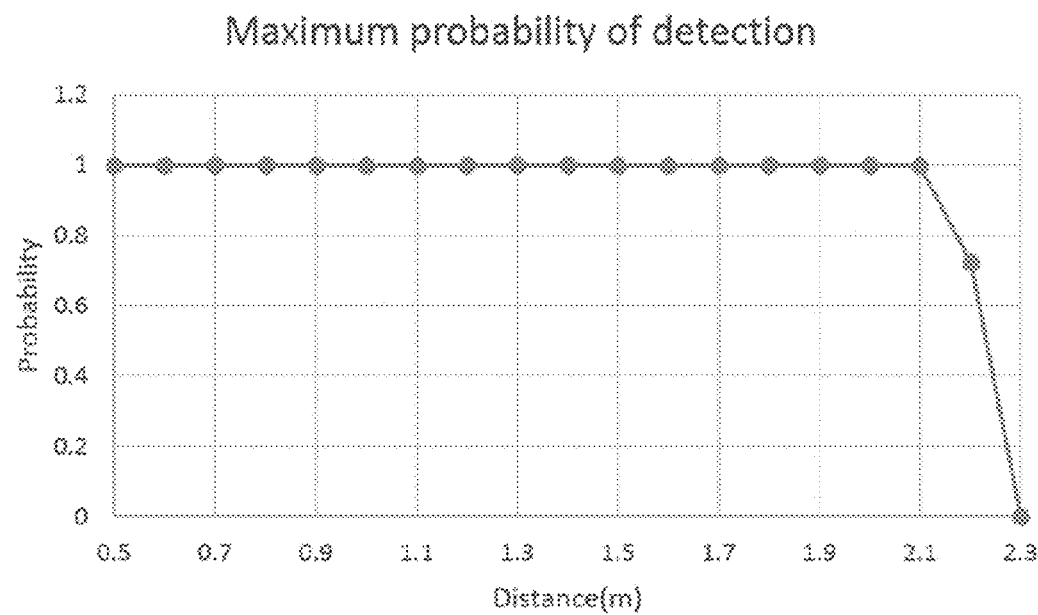
Figure 19:
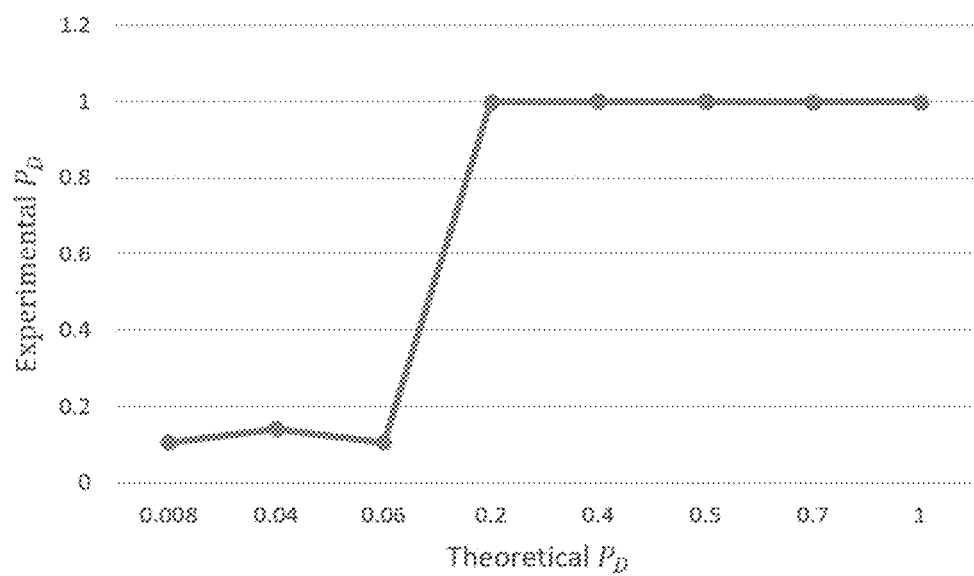
Figure 20:
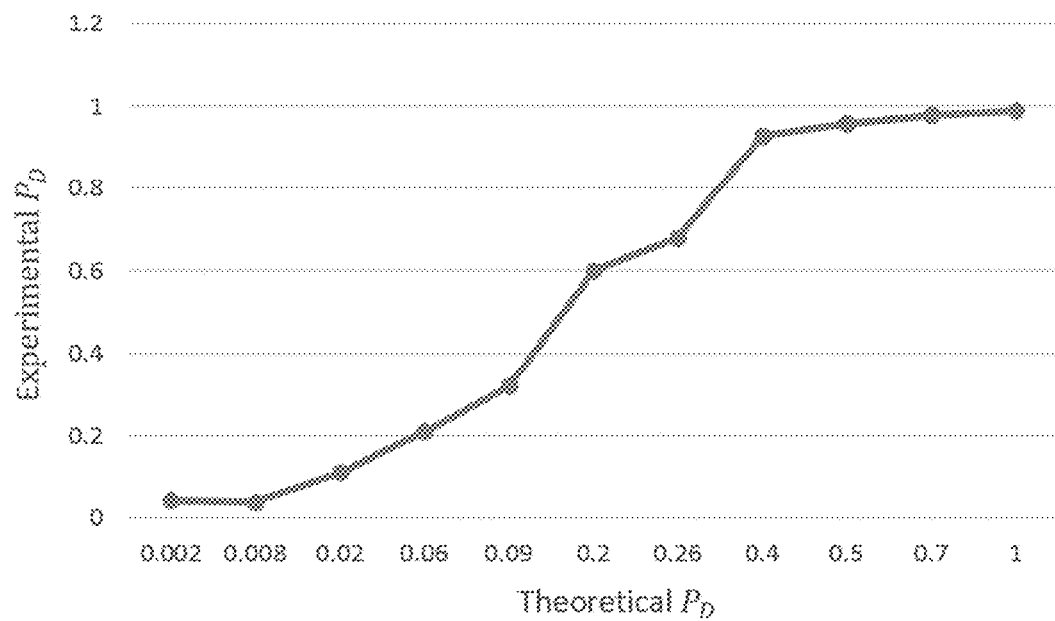

The third experiment was conducted using cardboards occupying the entire section of the sensor measurement cone for different distances ranging from 0.5 m to 2.3 m (see FIG. 18). When the target CS covers the entire conic section at a certain distance d, the probability of detection of the cardboard corresponds to the maximal probability of detection that occurred at the same distance (compared to the previous obtained values). FIG. 18 also shows that this maximum probability depends on the distance. Hypothesis $H_3$ is therefore verified.

Fourth Experiment: Relation Between $P_D$ and $P_D^{Max}$

Finally experiments using cardboards of width 5 cm and 10 cm were conducted to check the validity of hypothesis $H_4$. The values of the experimental probability of detection $P_{D,real}$ at a distance of 50 cm and 1 m, respectively, are plotted in terms of the theoretical probability of detection $P_{D,th}$ in FIGS. 19 and 20, respectively. These figures show that the experimental values of the probability of detection $P_{D,real}$ are sigmoidically dependent on the theoretical value $P_{D,th}$ computed in equations (11)-(17). In addition, the corresponding sigmoid function expressing the experimental $P_{D,real}$ in terms of the theoretical $P_{D,th}$ tends to 0 when the theoretical $P_{D,th}$ approaches 0. It tends to $P_D^{max}$ when the theoretical $P_{D,th}$ approaches $P_D^{max}$. Moreover, the shape of the sigmoid function (and therefore its parameter) depends on the distance to the nearest obstacle(s). When this distance increases the bell shape of the sigmoid function becomes smoother.

Fifth Experiment: Detection of Multiple Targets

The detection of several targets placed in the sensor measurement cone is now considered. This section proves the effectiveness of the occupancy model (i.e. inverse sensor model) proposed here to assess the free space in presence of multiple obstacles placed in the sensor measurement cone. It should be reminded that the occupancy model has been derived under the Nearest-Target hypothesis with hypotheses for the SM that have been validated above for the VL53L0X sensor.

In this experiment, two identical cardboards having a width of 9 cm were used. They were located at a distance of 30 cm (resp. 70 cm) from the sensor and placed at 7.5 cm on the left of its principle axis (resp. 21 cm on the right of the principle axis). 27 scan steps were made with a clockwise shift of 2° of the sensor FOV, starting from the position where the principal axis of the sensor cone is at 115°. The scanning was made using the VL53L0X sensor with the high accuracy mode.

The sectoral decomposition technique was applied with 3 sectors on a two-dimension (2D) uniform rectangular grid of width 1 m and length 2 m, composed of square cells of length 2 cm. The ISM derived from the SM with hypotheses $H_1$ to $H_4$ validated above was used to build the occupancy grid for each scanning angular position.

Figure 21:
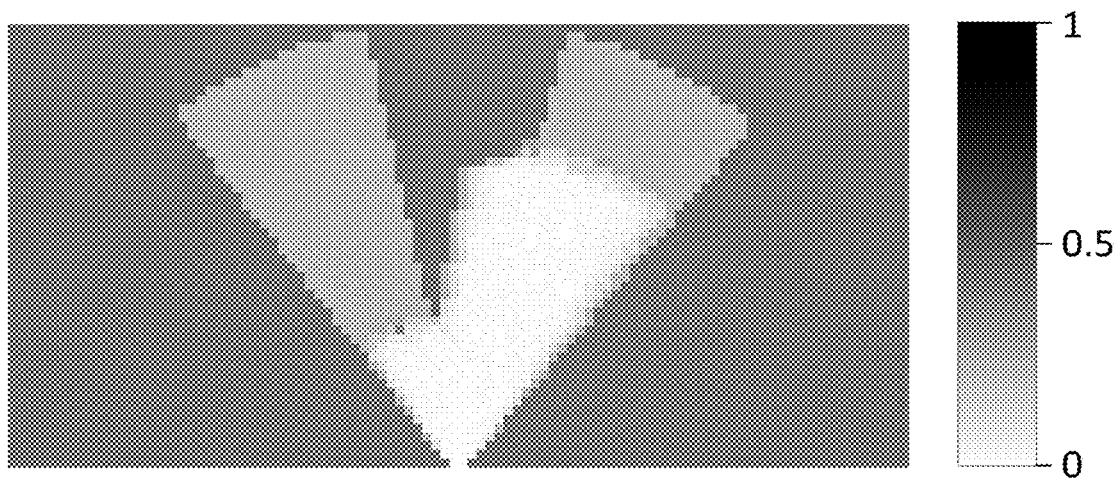

FIG. 21 shows the results of the fusion of the 27 occupancy grids obtained for each scan by applying the integer Bayesian Fusion technique from WO2017/050890. This experiment demonstrates that the sectoral decomposition technique can be used in conjunction with a scanning technique to properly assess the free space between the sensor and the obstacles and localize both obstacles, under the Nearest-Target hypothesis.

REFERENCES

[1] A. Elfes, "Occupancy grids: a stochastic spatial representation for active robot perception" (Sixth Conference on Uncertainty in AI, 1990)
[2] R. Dia, J. Mottin, T. Rakotovao, D. Puschini, and S. Lesecq, "Evaluation of Occupancy Grid Resolution through a Novel Approach for Inverse Sensor Modeling" in IFAC World Congress, Toulouse, France, July 2017.
[3] K. Pathak, A. Birk, J. Poppinga, and S. Schwertfeger, "3d forward sensor modeling and application to occupancy grid based sensor fusion" in Intelligent Robots and Systems, 2007. IROS 2007. IEEE/RSJ International Conference on. IEEE, 2007, pp. 2059-2064
[4] E. Kaufman, T. Lee, Z. Ai, and I. S. Moskowitz, "Bayesian occupancy grid mapping via an exact inverse sensor model" in American Control Conference (ACC), 2016 American Automatic Control Council (AACC), 2016, pp. 5709-5715.
[5] P. Stepan, M. Kulich, and L. Preucil, "Robust data fusion with occupancy grid" IEEE Transactions on Systems, Man, and Cybernetics, Part C (Applications and Reviews), vol. 35, no. 1, pp. 106-115, 2005.
[6] S. Thrun, W. Burgard, and D. Fox, "Probabilistic Robotics (Intelligent Robotics and Autonomous Agents)". The MIT Press, 2005.

The invention claimed is:

1. An environment sensing method comprising the following steps, carried out by a data processor:
a) defining an occupancy grid on a region including a field of view of a distance sensor, the grid comprising a plurality of cells, each having a quantized distance from the sensor;
b) acquiring at least one measurement result from the distance sensor, said measurement result being representative of the distance of one or more nearest targets from the sensor; and
c) computing an occupation probability of the cells of the occupancy grid by applying to the at least one measurement result an inverse sensor model stored in a memory device cooperating with the data processor;
wherein the inverse sensor model is stored in the memory device in the form of a data structure representing a plurality of grids, called model grids, associated to respective possible distance measurement results, at least some cells of a model grid corresponding to a plurality of contiguous cells of the occupancy grid belonging to a same of a plurality of angular sectors into which the field of view of the distance sensor is divided, and associating a same occupation probability to each one of said plurality of cells.

2. The method of claim 1, wherein at least some cells of at least one model grid correspond to a plurality of contiguous cells of the occupancy grid belonging to the same angular sector and having different quantized distances from the distance sensor.

3. The method of claim 1, wherein the model grids have a polar geometry and the occupancy grid a Cartesian geometry.

4. The method of claim 1, wherein the inverse sensor model is derived by considering as equivalent all configurations of the occupancy grid comprising at least an occupied cell belonging to a same angular sector and having a same quantized distance from the sensor.

5. The method of claim 4, wherein the inverse sensor model is further derived under the assumption that a detection probability of a target by the sensor depends on the angular position and the angular cross-section of the target as seen from the sensor.

6. The method of claim 1, wherein steps b) and c) are carried out a plurality of times, for a plurality of separate distance measurements, with a same or with different sensors, further comprising:
d) computing a consolidated occupancy grid comprising a plurality of cells, each having an occupation probability, by fusing the occupation probabilities computed from said plurality of separate distance measurements.

7. The method of claim 6, wherein at least some of said separate distance measurements correspond to different orientations of a same sensor, two consecutive orientations being separated by less than one half of the angular width of the field of view of the sensor.

8. The method of claim 1, wherein the field of view of the sensor includes at least two cells of the occupancy grid having a same distance from the sensor.

9. An environment sensing apparatus comprising:
an input port for receiving at a signal representative of a target distance measurement from a distance sensor;
a memory device storing an inverse sensor model; and a data processor configured for receiving said signal and using the signal for computing an occupation probability of the cells of an occupancy grid defined on a region including a field of view of said distance sensor by applying said inverse sensor model to the signal;

wherein the inverse sensor model is stored in the memory device in the form of a data structure representing a plurality of grids, called model grids, associated to respective possible distance measurement results, each cell of a model grid corresponding to a plurality of contiguous cells of the occupancy grid belonging to a same of a plurality of angular sectors into which the field of view of the distance sensor is divided, and associating a same occupation probability to each one of said plurality of cells.

10. The apparatus of claim 9, wherein at least some cells of at least one model grid of the inverse sensor model stored in the memory device correspond to a plurality of contiguous cells of the occupancy grid belonging to the same angular sector and having different quantized distances from the distance sensor.

11. The apparatus of claim 9, wherein the model grids have a polar geometry and the occupancy grid a Cartesian geometry.

12. The apparatus of claim 9, wherein the inverse sensor model is derived by considering as equivalent all configurations of the occupancy grid comprising at least an occupied cell belonging to a same angular sector and having a same quantized distance from the sensor.

13. The apparatus of claim 12, wherein the inverse sensor model is further derived under the assumption that a detection probability of a target by the sensor depends on the angular position and the angular cross-section of the target as seen from the sensor.

14. The apparatus of claim 9, wherein the data processor is configured for receiving a plurality of said signals from a same or from different sensors and for computing a consolidated occupation probability of the cells of the occupancy grid by fusing the occupation probabilities computed from said plurality of signals.

15. A computer-implemented method of computing an inverse sensor model of distance sensor configured for generating a signal representative of the distance of a nearest target, the method comprising the steps of:

i. defining an occupancy grid on a region including a field of view of the distance sensor, the occupancy grid comprising a plurality of cells, each having a quantized distance from the sensor;

ii. decomposing the field of view of the sensor in a plurality of angular sectors, each comprising a plurality of cells of the occupancy grid having a same quantized distance from the sensor;

iii. for every cell of the occupancy grid, computing the probability density of the value taken by the signal generated by the sensor, conditioned by an occupied state of the cell, said probability density being expressed by a sum of contributions corresponding to different states of the occupancy grid for which the cell is occupied;

iv. for every cell of the occupancy grid, computing the probability density of the value taken by the signal generated by the sensor, conditioned by an empty state of the cell, said probability density being expressed by a sum of contributions corresponding to different states of the occupancy grid for which the cell is empty;

v. computing the inverse sensor model from the probability densities computed at steps iii. and iv.; and vi. storing the inverse sensor model in a memory device in the form of a data structure representing a plurality of grids, called model grids, associated to respective possible distance measurement results, each cell of a model grid corresponding to a plurality of contiguous cells of the occupancy grid belonging to a same angular sector, and associating a same occupation probability to each one of said plurality of cells;

wherein steps iii. and iv. are carried out by considering as equivalent all the configuration of the occupancy grid comprising at least an occupied cell belonging to a same angular sector and having a same quantized distance from the distance sensor.

16. The method of claim 15, wherein step v. comprises computing a discrete model associating to each said plurality of cells of the occupancy grid a discrete probability value for each possible measurement result, whereby each cell of each model grid corresponds to a plurality of cells of the occupancy grid belonging to a same angular sector and to which a same discrete probability value is associated.

* * * * *